(12) United States Patent
Tanaka

(10) Patent No.: US 7,091,834 B2
(45) Date of Patent: Aug. 15, 2006

(54) THEFT PREVENTIVE DEVICE

(75) Inventor: Shinichi Tanaka, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 218 days.

(21) Appl. No.: 10/474,421

(22) PCT Filed: Apr. 12, 2002

(86) PCT No.: PCT/JP02/03707

§ 371 (c)(1),
(2), (4) Date: Oct. 9, 2003

(87) PCT Pub. No.: WO02/083465

PCT Pub. Date: Oct. 24, 2002

(65) Prior Publication Data
US 2004/0113760 A1    Jun. 17, 2004

(30) Foreign Application Priority Data

Apr. 12, 2001  (JP) .................. 2001-113490

(51) Int. Cl.
*B60R 25/02*  (2006.01)
*B60R 25/10*  (2006.01)

(52) U.S. Cl. .................. 340/426.11; 340/426.18; 340/426.25; 340/430; 340/667; 180/287; 180/289; 109/29; 297/217.3

(58) Field of Classification Search ................. 340/426.1–426.36, 541, 438, 430; 180/287, 180/289; 109/29; 701/45
See application file for complete search history.

(56) References Cited

U.S. PATENT DOCUMENTS

| 4,461,222 | A | * | 7/1984 | Brunner et al. ............. 109/29 |
| 4,897,630 | A | * | 1/1990 | Nykerk .................... 340/426.25 |
| 4,997,053 | A | * | 3/1991 | Drori et al. ............... 180/287 |
| 5,298,878 | A | * | 3/1994 | Smith .................... 340/426.12 |
| 5,529,372 | A | * | 6/1996 | Cohen .................... 297/217.3 |
| 5,677,668 | A | * | 10/1997 | Winner, Jr. ............... 340/438 |
| 5,796,330 | A | * | 8/1998 | Vinette .................. 340/426.26 |
| 5,912,615 | A | * | 6/1999 | Kretzmar et al. ......... 340/426.12 |
| 6,094,135 | A | * | 7/2000 | Sugimoto et al. ......... 340/541 |
| 6,791,456 | B1 | * | 9/2004 | Nakayama et al. ......... 340/429 |

FOREIGN PATENT DOCUMENTS

| CA | 2312627 | * | 12/2001 |
| FR | 2537070 A | * | 6/1984 |
| FR | 2553356 | * | 4/1985 |

(Continued)

OTHER PUBLICATIONS

MITSUBISHI Automobile Engineering: Publication 1991-81164, Abstract.*

*Primary Examiner*—Jeffery Hofsass
*Assistant Examiner*—Anne V. Lai
(74) *Attorney, Agent, or Firm*—Wenderoth, Lind & Ponack, L.L.P.

(57) ABSTRACT

An antitheft device is provided, whereby a person who attempts to commit a theft of a vehicle can be captured, having an improved crime prevention performance to thefts of vehicles, electrical equipment mounted on vehicles, money and articles left inside vehicles and the like. The antitheft device includes an expansible body system to expand an expansible body for blocking the motion of an intruder in a prescribed space inside a vehicle, which emits a substance to be a base of foaming polystyrene inside the vehicle and applies steam to the substance so that the foaming polystyrene blocks the motion of an intruder, when the presence of the intruder inside the vehicle is detected.

32 Claims, 19 Drawing Sheets

FOREIGN PATENT DOCUMENTS

| | | | |
|---|---|---|---|
| FR | 2596554 A1 | * | 10/1987 |
| FR | 2733194 | * | 10/1996 |
| FR | 2743920 | * | 7/1997 |
| GB | 2201820 A | * | 9/1988 |
| JP | 62-454 | | 1/1987 |
| JP | 3-81164 | | 8/1991 |
| JP | 7-237526 | | 9/1995 |
| JP | 07-237526 | * | 9/1995 |
| JP | 9-240432 | | 9/1997 |
| JP | 3074443 | | 10/2000 |

* cited by examiner

THEFT PREVENTIVE DEVICE

TECHNICAL FIELD

The present invention relates to an antitheft device and, more particularly, to an antitheft device for preventing thefts of a vehicle, electrical equipment mounted on the vehicle, money and articles left inside the vehicle and the like.

BACKGROUND ART

In Japan, both the number of cases and the incidence of theft, such as stealing cars and breaking into cars, are lower than in Europe and America, but are trending upward, which is an object of public concern. Therefore, in recent years, various antitheft devices for preventing car theft have been invented. Examples include devices which sound an alarm such as a siren, or turn on a lamp and the like, if a door lock of a car is broken or window glass such as front, rear, or side window glass is broken.

Sounding an alarm or turning on a lamp enables those around the car to find a car theft being committed, so that it appears to become possible to minimize the damage.

However, when there is no one around the car, or an intruder into the car does not mind the siren blowing or the lamp shining at all, there is a high possibility of the electrical equipment mounted on the car, or money and articles left inside the car being stolen, even if it is possible to prevent the car itself from being stolen.

As one method for solving this problem, making some kind of attack on a person who attempts to commit a car theft for preventing the theft is being considered. However, since car theft ranges in level from extremely vicious crimes to minor offenses, to make the same attack equally on any person that is attempting to commit a theft might become an issue in some cases. In addition, excessive attacks might only stimulate thieves.

DISCLOSURE OF INVENTION

The present invention was developed in order to solve the above problem, and it is an object of the present invention to provide an antitheft device, whereby a person who attempts to commit a theft of a vehicle can be captured or be driven away from the vehicle, having an improved crime prevention performance to thefts of the vehicle, electrical equipment mounted on the vehicle, money and articles left inside the vehicle and the like.

In order to achieve the above object, an antitheft device (1) according to the present invention is characterized by being an antitheft device for preventing thefts of a vehicle, electrical equipment mounted on the vehicle, money and articles left inside the vehicle and the like, comprising an expansible body system to expand an expansible body in a prescribed space inside the vehicle, an intruder detector to detect an intruder into the vehicle, and a first controller to control a driving unit of the expansible body system so as to expand the expansible body, when the presence of an intruder inside the vehicle is detected by the intruder detector.

An antitheft device (2) according to the present invention is characterized by the intruder detector, which detects the seating of a passenger, and the first controller, which concludes that an intruder is seated, when the seating of a passenger is detected while a first predetermined condition such as a security system being set is met, and controls the driving unit of the expansible body system so as to expand the expansible body in the above antitheft device (1).

Using the above antitheft device (1) or (2), being an antitheft device which is mounted on a car having an expansible body system to expand an expansible body in a prescribed space inside the car, it becomes possible to capture an intruder by expanding the expansible body so as to block the motion of the intruder when the presence of the intruder inside the car is detected, resulting in realization of an antitheft device having an improved crime prevention performance.

Furthermore, using the above antitheft device (2), the expansible body is expanded when not only the presence of an intruder, but also the seating of the intruder in the driver's seat or the like is detected, so that the motion of the intruder can be more reliably blocked.

An antitheft device (3) according to the present invention is characterized by being an antitheft device for preventing thefts of a vehicle, electrical equipment mounted on the vehicle, money and articles left inside the vehicle and the like, comprising an expansible body system to expand an expansible body in a prescribed space inside the vehicle, an intrusion pre-detector to detect a person who is attempting to intrude into the vehicle, and a second controller to control a driving unit of the expansible body system so as to expand the expansible body, when a preset time elapses after a person who is attempting to intrude into the vehicle is detected by the intrusion pre-detector.

Using the above antitheft device (3), the expansible body is expanded when the preset time (for example, a time which a person who attempts to steal a car may require between the approach to the car and the seating in the driver's seat or passenger seat) elapses after a person who is attempting to intrude into the car (for example, a person who is closer to the car) is detected.

That is, at the timing when a person who attempts a theft of a car may be seated in the driver's seat or passenger seat, the expansible body is expanded so as to block the motion of the intruder. As a result, it becomes possible to capture the intruder, leading to realization of an antitheft device having an improved crime prevention performance.

By the way, in the above antitheft device (1), the expansible body is expanded when the presence of an intruder into the car is detected. Therefore, in order to normally operate the crime prevention function of the above antitheft device (1), it is necessary to obtain signals from a sensor to detect an intruder into a car, which is mounted on the car having the device, and the like.

However, there is a risk that such sensor may be broken by a skillful intruder. If the sensor has been broken before the sensor detects the presence of an intruder, it is impossible to expand the expansible body, so that the motion of the intruder cannot be blocked.

On the other hand, in the above antitheft device (3), the expansible body is expanded, not when the presence of an intruder into the car is detected, but when the preset time (for example, a time which a person who attempts to steal a car may require between the approach to the car and the seating in the driver's seat or passenger seat) elapses after a person who is attempting to intrude into the car (for example, a person who is closer to the car) is detected.

Therefore, in order to normally operate the crime prevention function of the above antitheft device (3), it is only necessary to obtain signals from a sensor to detect a person who is closer to a car, which is mounted on the car having the device.

It is a matter of course that there is also a risk that such sensor may be broken by a skillful intruder, but the sensor detects not the presence of an intruder inside the car but a person who is closer to the car (or who is attempting to intrude into the car). Therefore, it is little thought that the sensor is broken before detecting a person approaching the car.

As a result, even if the sensor has been broken, it is possible to expand the expansible body so as to block the motion of the intruder.

An antitheft device (4) according to the present invention is characterized by the driving unit of the expansible body system, which emits a substance to be a base of foaming polystyrene inside the vehicle and applies steam to the emitted substance in any of the above antitheft devices (1)–(3).

In the above antitheft device (4), the driving unit of the expansible body system emits a substance to be a base of foaming polystyrene inside the car and makes the emitted substance exposed to steam. Therefore, if an intruder into the car is detected, foaming polystyrene (polystyrene containing air bubbles) blocks the motion of the intruder, so that the motion of the intruder can be blocked without inflicting a severe injury upon the intruder.

An antitheft device (5) according to the present invention is characterized by the expansible body system, being an air bag system in any of the above antitheft devices (1)–(3).

In the above antitheft device (5), the expansible body system is an air bag system. Therefore, if an intruder into the car is detected, the motion of the intruder can be blocked by expanding the air bag. And the air bag system is not additionally mounted for car theft prevention, resulting in a reduction in cost.

An antitheft device (6) according to the present invention is characterized by comprising a third controller, being connected to a driving unit of a gas ejection system to eject gas such as steam or cold air inside the vehicle, which is mounted on the vehicle, to control the driving unit of the gas ejection system so as to eject gas inside the vehicle, when a second predetermined condition such as an elapse of a preset time is met after a condition for expanding the expansible body is met in any of the above antitheft devices (1)–(5).

Using the above antitheft device (6), it is possible to eject gas such as steam or cold air inside the car, when the second predetermined condition is satisfied after the condition for expanding the expansible body is satisfied (for example, when a certain time elapses after the expansion of the expansible body is started).

As a result, even if an intruder cannot be confined by expanding the expansible body, it is possible to drive the intruder away by ejecting the gas.

An antitheft device (7) according to the present invention is characterized by comprising a reporting unit to make a report to the outside and a first report controller to control the reporting unit so as to make a report to the outside, when a condition for expanding the expansible body is met in any of the above antitheft devices (1)–(6).

Using the above antitheft device (7), not only an attempt to block the motion of an intruder by expanding the expansible body, but also reporting to the outside (such as the Police) is carried out, leading to swift capture of the intruder.

An antitheft device (8) according to the present invention is characterized by being an antitheft device for preventing thefts of a vehicle, electrical equipment mounted on the vehicle, money and articles left inside the vehicle and the like, comprising a gas ejection system to eject gas such as steam or cold air inside the vehicle, an intruder detector to detect an intruder into the vehicle, and a fourth controller to control a driving unit of the gas ejection system so as to eject gas inside the vehicle, when the presence of an intruder inside the vehicle is detected by the intruder detector.

An antitheft device (9) according to the present invention is characterized by the intruder detector, which detects the seating of a passenger, and the fourth controller which concludes that an intruder is seated, when the seating of a passenger is detected while a first predetermined condition such as a security system being set is met, and controls the driving unit of the gas ejection system so as to eject gas inside the vehicle in the above antitheft device (8).

Using the above antitheft device (8) or (9), being an antitheft device mounted on a car which has a gas ejection system to eject gas inside the car, it is possible to block the motion of an intruder or drive the intruder away from the car by ejecting gas inside the car so as to restrict the intruder's vision or frighten the intruder, when the presence of the intruder inside the car is detected. As a result, an antitheft device having an improved crime prevention performance can be realized.

Furthermore, using the above antitheft device (9), gas is ejected inside the car when not only the presence of an intruder, but also the seating of the intruder in the driver's seat or the like is detected, so that the intruder's vision can be more reliably restricted.

An antitheft device (10) according to the present invention is characterized by being an antitheft device for preventing thefts of a vehicle, electrical equipment mounted on the vehicle, money and articles left inside the vehicle and the like, comprising a gas ejection system to eject gas such as steam or cold air inside the vehicle, an intrusion pre-detector to detect a person who is attempting to intrude into the vehicle, and a fifth controller to control a driving unit of the gas ejection system so as to eject gas inside the vehicle, when a preset time elapses after a person who is attempting to intrude into the vehicle is detected by the intrusion pre-detector.

In the above antitheft device (10), gas is ejected inside the car when the preset time (for example, a time which a person who attempts to steal a car may require between the approach to the car and the seating in the driver's seat or passenger seat) elapses after a person who is attempting to intrude into the car (for example, a person who is closer to the car) is detected.

That is, at the timing when a person who attempts a theft of a car may be seated in the driver's seat or passenger seat, gas is ejected inside the car so as to restrict the intruder's vision or frighten the intruder. As a result, it is possible to block the motion of the intruder or drive the intruder away from the car, leading to realization of an antitheft device having an improved crime prevention performance.

By the way, in the above antitheft device (8), gas is ejected inside the car when the presence of an intruder inside the car is detected. Therefore, in order to normally operate the crime prevention function of the above antitheft device (8), it is necessary to obtain signals from a sensor to detect an intruder into a car, which is mounted on the car having the device, and the like.

However, there is a risk that such sensor may be broken by a skillful intruder. If the sensor has been broken before the sensor detects the presence of an intruder, it is impossible to eject gas inside the car, so that the motion of the intruder cannot be blocked.

On the other hand, in the above antitheft device (10), gas is ejected, not when the presence of an intruder is detected, but when the preset time (for example, a time which a person who attempts to steal a car may require between the approach to the car and the seating in the driver's seat or passenger seat) elapses after a person who is attempting to intrude into the car (for example, a person who is closer to the car) is detected.

Therefore, in order to normally operate the crime prevention function of the above antitheft device (10), it is only necessary to obtain signals from a sensor to detect a person who is closer to a car, which is mounted on the car having the device.

It is a matter of course that there is also a risk that such sensor may be broken by a skillful intruder, but the sensor detects not the presence of an intruder inside the car but a person who is closer to the car (or who is attempting to intrude into the car). Therefore, it is little thought that the sensor is broken before detecting a person approaching the car.

As a result, even if the sensor has been broken, it is possible to eject gas inside the car so as to drive the intruder away.

An antitheft device (11) according to the present invention is characterized by being an antitheft device for preventing thefts of a vehicle, electrical equipment mounted on the vehicle, money and articles left inside the vehicle and the like, comprising a seat state changing system to change the state of a seat placed inside the vehicle, an intruder detector to detect an intruder into the vehicle, and a sixth controller to control a driving unit of the seat state changing system so as to change the state of the seat into a first prescribed state so that the motion of an intruder is blocked, when the presence of the intruder inside the vehicle is detected by the intruder detector.

An antitheft device (12) according to the present invention is characterized by the intruder detector, which detects the seating of a passenger, and the sixth controller, which concludes that an intruder is seated, when the seating of a passenger is detected while a first predetermined condition such as a security system being set is met, and controls the driving unit of the seat state changing system so as to change the state of the seat into the first prescribed state so that the motion of the intruder is blocked in the above antitheft device (11).

Using the above antitheft device (11) or (12), being an antitheft device mounted on a car which has a seat state changing system to change the state of a seat placed inside the car, it is possible to capture an intruder by changing the state of the seat into the first prescribed state (for example, the state of the seat being slid forward in the car) so as to block the motion of the intruder when the presence of the intruder inside the car is detected. As a result, an antitheft device having an improved crime prevention performance can be realized.

Furthermore, using the above antitheft device (12), the seat state is changed into the first prescribed state when not only the presence of an intruder, but also the seating of the intruder in the driver's seat or the like is detected, so that the motion of the intruder can be more reliably blocked.

An antitheft device (13) according to the present invention is characterized by being an antitheft device for preventing thefts of a vehicle, electrical equipment mounted on the vehicle, money and articles left inside the vehicle and the like, comprising a seat state changing system to regulate the state of a seat placed inside the vehicle, an intrusion pre-detector to detect a person who is attempting to intrude into the vehicle, and a seventh controller to control a driving unit of the seat state changing system so as to change the state of the seat into a first prescribed state so that the motion of an intruder is blocked, when a preset time elapses after a person who is attempting to intrude into the vehicle is detected by the intrusion pre-detector.

In the above antitheft device (13), being an antitheft device mounted on a car which has a seat state changing system to change the state of a seat placed inside the car, the seat state is changed into the first prescribed state (for example, the state of the seat being slid forward in the car) when the preset time (for example, a time which a person who attempts to steal a car may require between the approach to the car and the seating in the driver's seat or passenger seat) elapses after a person who is attempting to intrude into the car (for example, a person who is closer to the car) is detected.

That is, at the timing when a person who attempts a theft of a car may be seated in the driver's seat or passenger seat, the seat state is changed into the first prescribed state so as to block the motion of the intruder. As a result, it is possible to capture the intruder, leading to realization of an antitheft device having an improved crime prevention performance.

By the way, in the above antitheft device (11), the seat state is changed into the first prescribed state when the presence of an intruder inside the car is detected. Therefore, in order to normally operate the crime prevention function of the above antitheft device (11), it is necessary to obtain signals from a sensor to detect an intruder into a car, which is mounted on the car having the device, and the like.

However, there is a risk that such sensor may be broken by a skillful intruder. If the sensor has been broken before the sensor detects the presence of an intruder, it is impossible to change the seat state into the first prescribed state, so that the motion of the intruder cannot be blocked.

On the other hand, in the above antitheft device (13), the seat state is changed into the first prescribed state, not when the presence of an intruder is detected, but when the preset time (for example, a time which a person who attempts to steal a car may require between the approach to the car and the seating in the driver's seat or passenger seat) elapses after a person who is attempting to intrude into the car (for example, a person who is closer to the car) is detected.

Therefore, in order to normally operate the crime prevention function of the above antitheft device (13), it is only necessary to obtain signals from a sensor to detect a person who is closer to a car, which is mounted on the car having the device.

It is a matter of course that there is also a risk that such sensor may be broken by a skillful intruder, but the sensor detects not the presence of an intruder inside the car but a person who is closer to the car (or who is attempting to intrude into the car). Therefore, it is little thought that the sensor is broken before detecting a person approaching the car.

As a result, even if the sensor has been broken, it is possible to change the seat state into the first prescribed state so as to block the motion of the intruder.

An antitheft device (14) according to the present invention is characterized by the first prescribed state, being the state of the seat being moved forward in the vehicle, and/or the backrest portion of the seat being inclined forward in the vehicle in any of the above antitheft devices (11)–(13).

In the above antitheft device (14), the first prescribed state is the state of the seat being moved forward in the car, and/or the backrest portion of the seat being inclined forward in the car. Therefore, when an intruder is seated in the driver's seat, for example, the driver's seat is caused to slide forward, or the backrest portion of the seat is caused to incline forward.

As a result, it is possible to reliably block the motion of the intruder without inflicting a severe injury upon the intruder.

An antitheft device (15) according to the present invention is characterized by comprising an eighth controller, being connected to a driving unit of a steering state changing system to change the state of the steering, which is mounted on the vehicle, to control the driving unit of the steering state changing system so as to change the state of the steering into a second prescribed state so that the motion of an intruder is blocked, when a condition for changing the state of the seat into the first prescribed state is met in any of the above antitheft devices (11)–(14).

Using the above antitheft device (15), it is possible not only to change the seat state into the first prescribed state, but also to change the steering state into the second prescribed state (such as the state of being tilted downward), when the condition for changing the seat state into the first prescribed state is satisfied.

As a result, even if the motion of an intruder cannot be blocked sufficiently by changing the seat state, it is possible to confine the intruder more reliably by changing the steering state.

An antitheft device (16) according to the present invention is characterized by the second prescribed state, being the state of the steering being tilted downward, and/or the steering being protruded rearward in the vehicle in the above antitheft device (15).

In the above antitheft device (16), the second prescribed state is the state of the steering being tilted downward, and/or the steering being protruded backward in the car. Therefore, when an intruder is seated in the driver's seat, for example, the steering is caused to tilt downward, or the steering is caused to protrude toward the intruder. As a result, it is possible to reliably block the motion of the intruder without inflicting a severe injury upon the intruder.

An antitheft device (17) according to the present invention is characterized by comprising a ninth controller, being connected to a driving unit of an expansible body system to expand an expansible body in a prescribed space inside the vehicle, which is mounted on the vehicle, to control the driving unit of the expansible body system so as to expand the expansible body, when a condition for changing the state of the seat into the first prescribed state is met in any of the above antitheft devices (11)–(16).

An antitheft device (18) according to the present invention is characterized by the prescribed space, being around the seat in the above antitheft device (17).

Using the above antitheft device (17) or (18), it is possible not only to change the seat state into the first prescribed state, but also to expand the expansible body, when the condition for changing the seat state into the first prescribed state is satisfied. As a result, even if an intruder cannot be confined sufficiently by changing the seat state, it is possible to confine the intruder more reliably by expanding the expansible body.

Furthermore, using the above antitheft device (18), since the expansible body is expanded around the seat, particularly an intruder sitting in the seat can be reliably confined and captured.

An antitheft device (19) according to the present invention is characterized by the driving unit of the expansible body system, which emits a substance to be a base of foaming polystyrene inside the vehicle and applies steam to the emitted substance in the above antitheft device (17) or (18).

In the above antitheft device (19), the driving unit of the expansible body system emits a substance to be a base of foaming polystyrene inside the car and makes the emitted substance exposed to steam. Therefore, if an intruder into the car is detected, foaming polystyrene (polystyrene containing air bubbles) blocks the motion of the intruder, so that the motion of the intruder can be blocked without inflicting a severe injury upon the intruder.

An antitheft device (20) according to the present invention is characterized by the expansible body system, being an air bag system in the above antitheft device (17) or (18).

In the above antitheft device (20), the expansible body system is an air bag system. Therefore, if an intruder into the car is detected, the motion of the intruder can be blocked by expanding the air bag. And the air bag system is not additionally mounted for car theft prevention, resulting in a reduction in cost.

An antitheft device (21) according to the present invention is characterized by comprising a tenth controller, being connected to a driving unit of a gas ejection system to eject gas such as steam or cold air inside the vehicle, which is mounted on the vehicle, to control the driving unit of the gas ejection system so as to eject gas inside the vehicle, when a third predetermined condition such as an elapse of a preset time is met after a condition for changing the state of the seat into the first prescribed state is met in any of the above antitheft devices (11)–(20).

Using the above antitheft device (21), it is possible to eject gas such as steam or cold air inside the car, when the third predetermined condition is satisfied after the condition for changing the seat state into the first prescribed state is satisfied (for example, when a certain time elapses after changing the seat state).

As a result, even if an intruder cannot be confined by changing the seat state, it is possible to drive the intruder away by ejecting the gas.

An antitheft device (22) according to the present invention is characterized by comprising a reporting unit to make a report to the outside and a second report controller to control the reporting unit so as to make a report to the outside, when a condition for changing the state of the seat into the first prescribed state is met in any of the above antitheft devices (11)–(21).

Using the above antitheft device (22), not only an attempt to block the motion of the intruder by changing the seat state, but also reporting to the outside (such as the Police) is carried out, leading to swift capture of the intruder.

BEST MODE FOR CARRYING OUT THE INVENTION

Figure 1:
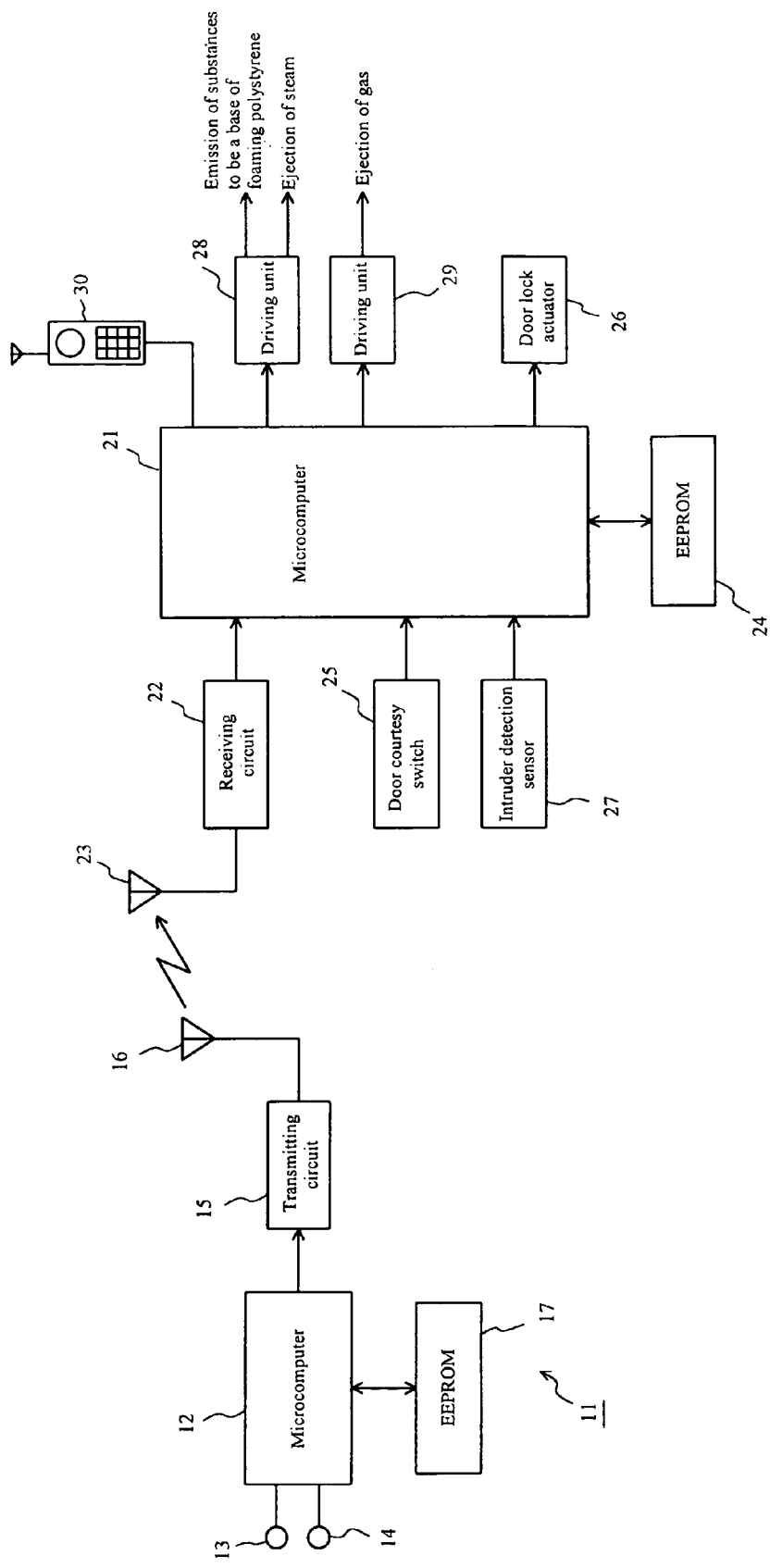
FIG. 1 is a block diagram schematically showing the principal part of an antitheft system using an antitheft device according to an embodiment (1) of the present invention.

The preferred embodiments of the antitheft device according to the present invention are described below by reference to the accompanying drawings. FIG. 1 is a block diagram schematically showing the principal part of an antitheft system wherein an antitheft device according to an embodiment (1) is adopted.

Reference numeral 11 in the figure represents a transmitter, comprising a microcomputer 12, a locking switch 13, an unlocking switch 14, a transmitting circuit 15, an antenna 16 and an EEPROM 17 in which an ID code is stored.

The locking switch 13 and unlocking switch 14 are connected to input terminals of the microcomputer 12. When the locking switch 13 or unlocking switch 14 is pressed, the microcomputer 12 captures a door locking command code corresponding to each switch from a ROM (not shown) and sends a signal of the ID code plus the door locking command code from the antenna 16 through the transmitting circuit 15.

A microcomputer 21 constituting the main body of the antitheft system, judges whether or not the ID code included in the signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

For example, when the door locking command code shows locking of doors and the detected signal from the door courtesy switch 25 shows the closed state of the doors, a door lock actuator 26 is controlled so as to lock the doors and the arming mode (or the state of a security system being set) is set. And if the door locking command code shows unlocking of doors, the door lock actuator 26 is controlled so as to unlock the doors and the arming mode is cleared, resulting in the disarming mode (or reset of the security system).

Moreover, in cases where the arming mode has been set, the microcomputer 21 captures a signal from an intruder detection sensor 27 to detect an intruder into the car. Based on the captured signal, it controls a driving unit 28 to drive a function of emitting a large number of substances (e.g. grains having a diameter of about 5 mm) to be a base of foaming polystyrene around the driver's seat or passenger seat and applying steam to the emitted substances, controls a driving unit 29 to drive a function of ejecting such a large quantity of steam (or cold air) as can restrict the intruder's vision, or controls a mobile telephone 30 so as to make a report to the Police. Here, as the intruder detection sensor 27, a method wherein the motion of a person who intruded into the car is ultrasonically detected is exemplified.

Figure 2:
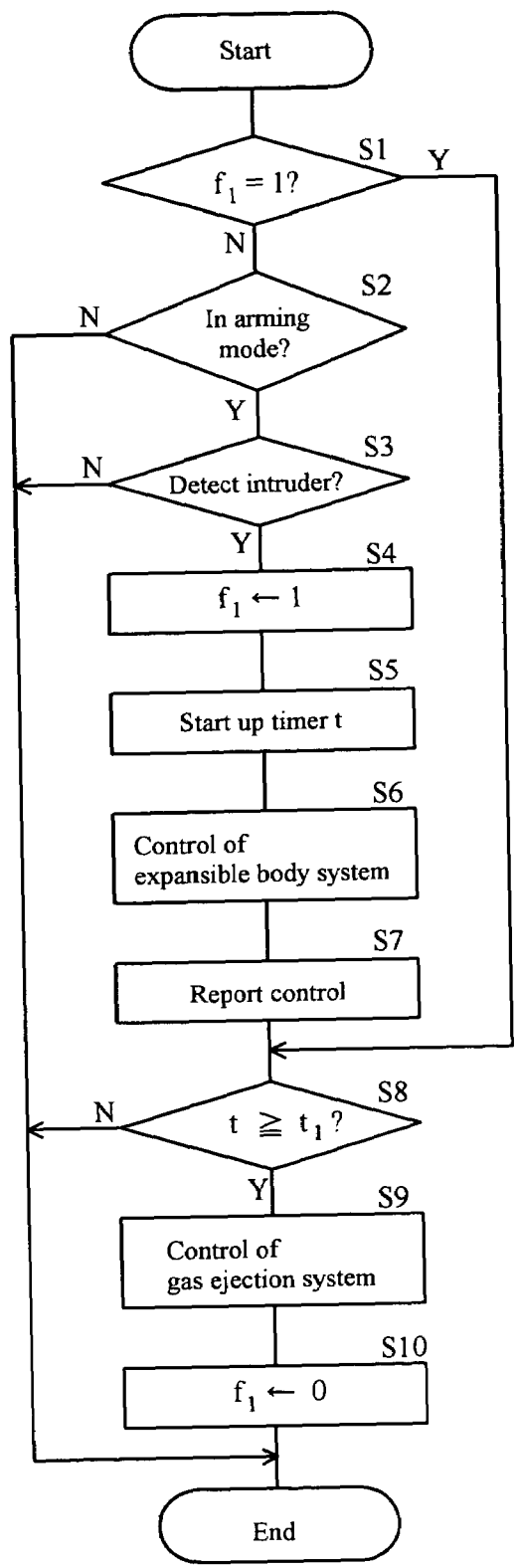
FIG. 2 is a flow chart showing the processing operation performed by a microcomputer in the antitheft system using the antitheft device according to the embodiment (1)

The processing operation ① performed by the microcomputer 21 in the antitheft system wherein the antitheft device according to the embodiment (1) is adopted is described below by reference to a flow chart shown in FIG. 2. First, whether a flag $f_1$ showing the presence of an intruder inside the car is 1 or not is judged (Step 1). When the flag $f_1$ is judged not to be 1, whether the arming mode has been set or not is judged (Step 2). When it is judged that the arming mode has been set, whether an intruder is inside the car or not is judged based on a signal from the intruder detection sensor 27 (Step 3). On the other hand, when it is judged that the arming mode has not been set, the processing operation ① is ended.

When it is judged that an intruder is inside the car through the judgment in Step 3, the flag $f_1$ is changed to 1 (Step 4), a timer t is started up (Step 5), and the driving unit 28 is controlled so as to emit substances to be a base of foaming polystyrene around the driver's seat or passenger seat and apply steam to the substances (Step 6). Furthermore, a report to the Police is made using the mobile telephone 30 (Step 7), and then the operation goes to Step 8. On the other hand, when it is judged that no intruder is inside the car, the processing operation ① is ended at once because it is not necessary to emit the substances to be a base of foaming polystyrene.

In Step 8, whether the timer t has counted to a prescribed time $t_1$ (e.g. 20 seconds) or not is judged. When it is judged that the timer t has counted to the prescribed time $t_1$, or that the prescribed time $t_1$ has elapsed since the formation of foaming polystyrene was started, the driving unit 29 is controlled so as to eject a large quantity of steam (or cold air) (Step 9), and the flag $f_1$ is returned to 0 (Step 10). On the other hand, when it is judged that the timer t has not counted to the prescribed time $t_1$, the processing operation ① is ended at once.

By the way, when the flag $f_1$ is judged to be 1 through the judgment in Step 1, foaming polystyrene has been already formed and a report to the Police has been made, so that the operation bypasses Steps 2–7 and goes to Step 8.

Using the above antitheft device according to the embodiment (1), when an intruder into the car is detected, substances to be a base of foaming polystyrene are emitted around the driver's seat or passenger seat and steam is applied to the substances to expand them (for example, about 30–80 times), so that the expanded foaming polystyrene blocks the motion of the intruder, resulting in capture of the intruder.

Moreover, not only foaming polystyrene is formed, but also a large amount of steam (or cold air) is ejected inside the car. Therefore, it is possible to drive the intruder away by the gas, even if the intruder cannot be confined by foaming polystyrene. Furthermore, not only the motion of the intruder is blocked by foaming polystyrene or gas, but also a report to the outside (e.g. the Police) is made, so that it becomes possible to capture the intruder without delay.

Figure 3:
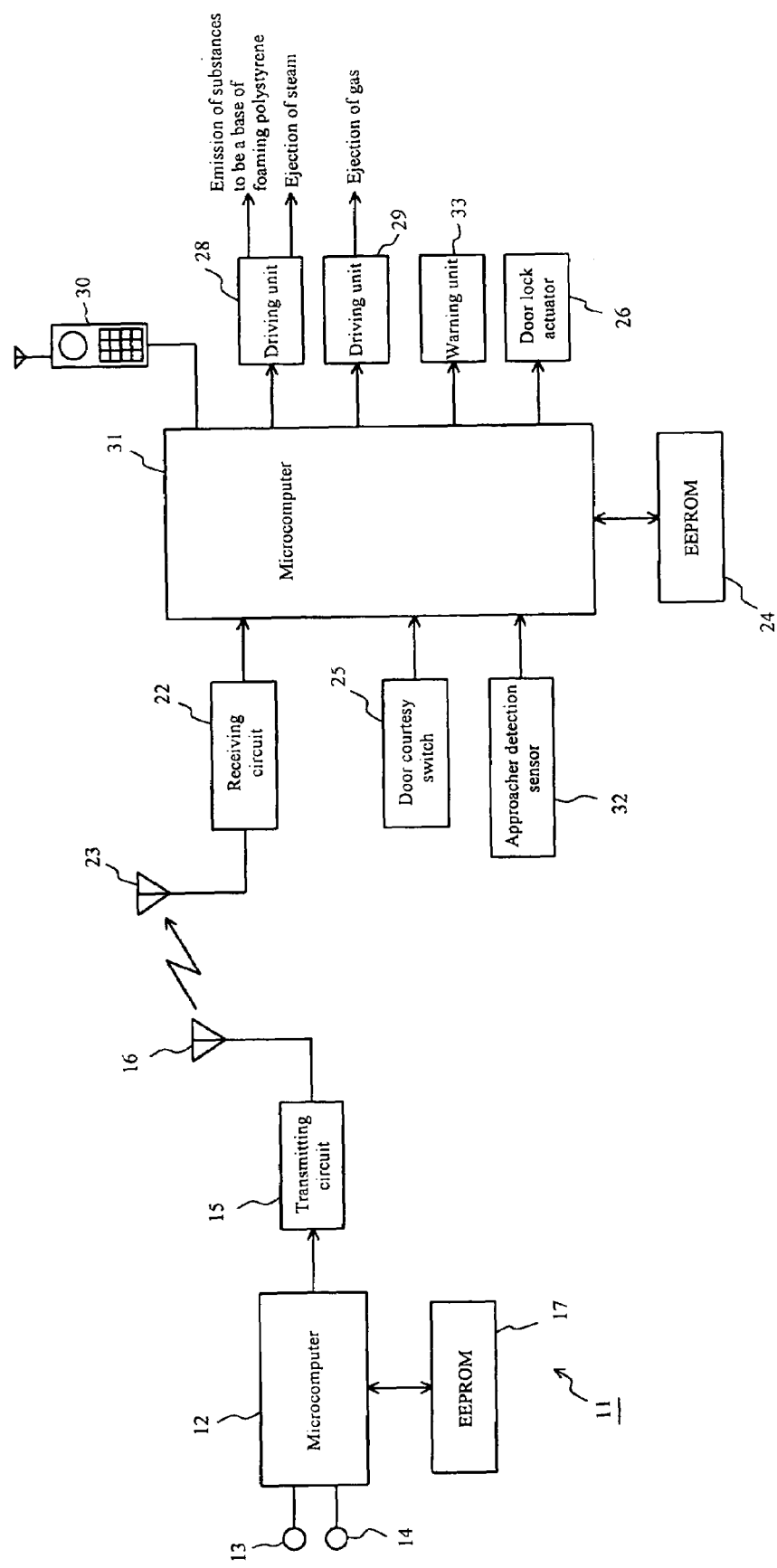
FIG. 3 is a block diagram schematically showing the principal part of an antitheft system using an antitheft device according to an embodiment (2)

FIG. 3 is a block diagram schematically showing the principal part of an antitheft system wherein an antitheft device according to an embodiment (2) is adopted. Here, the same components as those in the antitheft system shown in FIG. 1 are similarly marked and not described below.

A microcomputer 31 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 31 captures a signal from an approacher detection sensor 32 to detect a person who is attempting to intrude into the car (here, a person who is closer to the car). Based on the signal from the approacher detection sensor 32, driving units 28 and 29, a mobile telephone 30 and a warning unit 33 are controlled. Here, as the approacher detection sensor 32, a method wherein the motion of a person who is closer to the vehicle is ultrasonically detected is exemplified.

Figure 4:
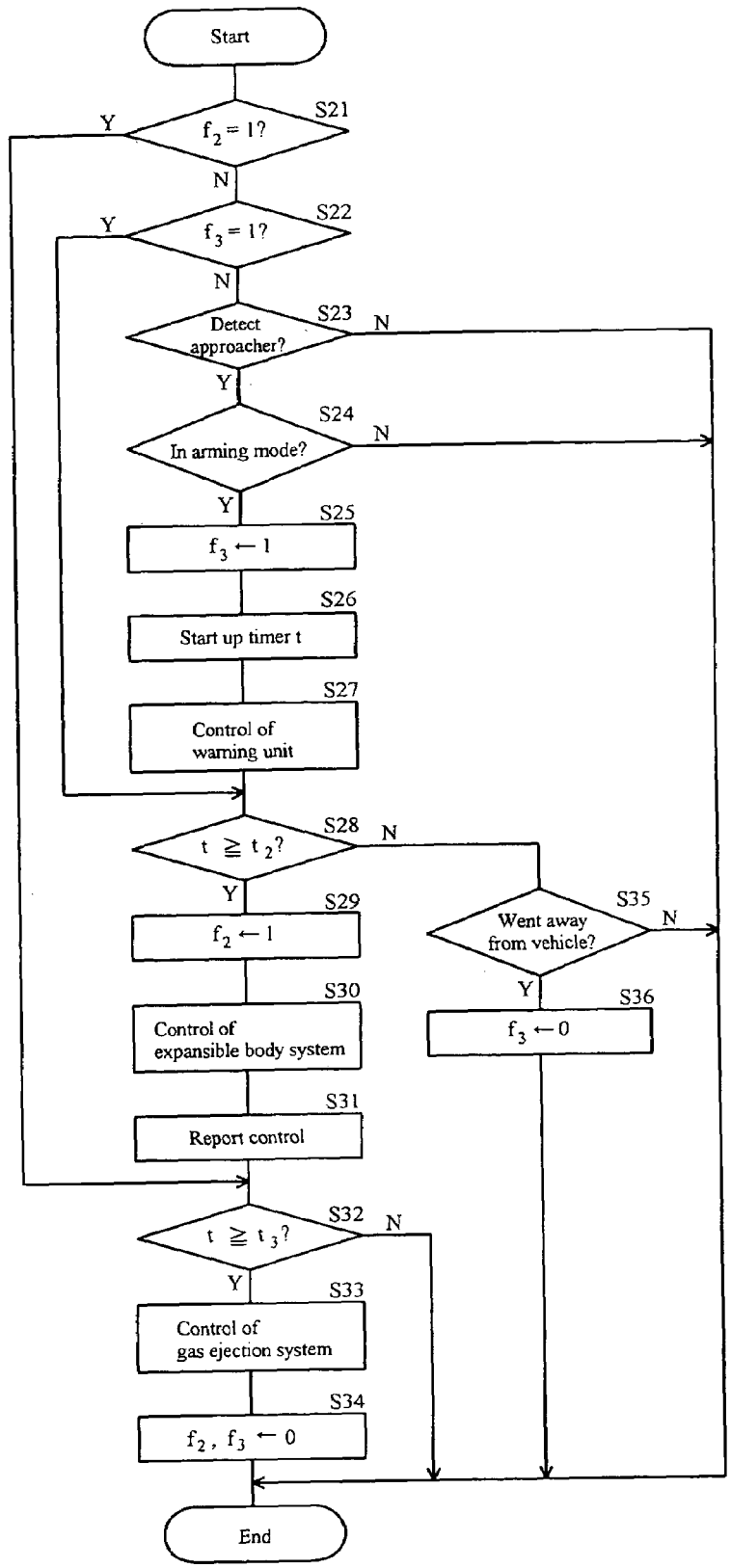
FIG. 4 is a flow chart showing the processing operation performed by a microcomputer in the antitheft system using the antitheft device according to the embodiment (2)

The processing operation ② performed by the microcomputer 31 in the antitheft system wherein the antitheft device according to the embodiment (2) is adopted is described below by reference to a flow chart shown in FIG. 4. First, whether a flag $f_2$ showing that it is concluded that an intruder is inside the car (see the below-described Step 29) is 1 or not is judged (Step 21). When the flag $f_2$ is judged not to be 1, whether a flag $f_3$ showing the presence of an approacher to the vehicle is 1 or not is judged (Step 22).

When the flag $f_3$ is judged not to be 1, whether a person approaching the vehicle is there or not is judged (Step 23). When it is judged that there is an approacher, whether the arming mode has been set or not is judged (Step 24). On the other hand, when it is judged that there is no approacher, the processing operation ② is ended.

When it is judged that the arming mode has been set through the judgment in Step 24, the flag $f_3$ is changed to 1 (Step 25), a timer t is started up (Step 26), and the warning unit 33 is controlled so as to sound a warning buzzer (Step 27). And whether the timer t has counted to a prescribed time $t_2$ (e.g. 10 seconds) or not is judged (Step 28). On the other hand, when it is judged that the arming mode has not been set, the processing operation ② is ended.

When it is judged that the timer t has counted to the prescribed time $t_2$ through the judgment in Step 28, it is concluded that a person who was closer to the car intruded into the car and has been seated in the driver's seat or passenger seat, and the flag $f_2$ is changed to 1 (Step 29). The driving unit 28 is controlled so as to emit substances to be a base of foaming polystyrene around the driver's seat or passenger seat and apply steam to the substances (Step 30). Furthermore, a report to the Police is made using the mobile telephone 30 (Step 31), and then the operation goes to Step 32.

In Step 32, whether the timer t has counted to a prescribed time $t_3$ (e.g. 30 seconds) or not is judged. When it is judged that the timer t has counted to the prescribed time $t_3$, or that a prescribed time $t_1$ (=$t_3$–$t_2$) has elapsed since the formation of foaming polystyrene was started, the driving unit 29 is controlled so as to eject a large amount of steam (or cold air) (Step 33) and the flags $f_2$ and $f_3$ are returned to 0 (Step 34). On the other hand, when it is judged that the timer t has not counted to the prescribed time $t_3$, the processing operation ② is ended at once.

By the way, when it is judged that the timer t has not counted to the prescribed time $t_2$ through the judgment in Step 28, whether the person who was closer to the vehicle has gone away from the vehicle or not is judged based on a signal from the approacher detection sensor 32 (Step 35). When the approacher is judged to have gone away from the vehicle, the flag $f_3$ is returned to 0 because it is not necessary to emit the substances to be a base of foaming polystyrene inside the vehicle (Step 36). On the other hand, when the approacher is judged not to have gone away from the vehicle, the processing operation ② is ended at once.

And when the flag $f_3$ is judged to be 1 through the judgment in Step 22, the approacher to the vehicle has been already detected and a warning buzzer has been sounded, so that the operation bypasses Steps 23–27 and goes to Step 28. When the flag $f_2$ is judged to be 1 through the judgment in Step 21, foaming polystyrene has been already formed and a report to the Police has been made, so that the operation bypasses Steps 22–31 and goes to Step 32.

Using the above antitheft device according to the embodiment (2), when the prescribed time $t_2$ (for example, a time which a person who attempts to steal a car may require between the approach to the car and the seating in the driver's seat or passenger seat) elapses after a person who is attempting to intrude into the car (e.g. a person who is closer to the car) is detected while the arming mode has been set, substances to be a base of foaming polystyrene are emitted around the driver's seat or passenger seat and steam is applied to the substances to expand them (for example, about 30–80 times), so that the expanded foaming polystyrene blocks the motion of the intruder, resulting in capture of the intruder.

That is, at the timing when the person who is attempting a car theft may be seated in the driver's seat or passenger seat, foaming polystyrene is formed so as to block the motion of the intruder. Therefore, it becomes possible to capture the intruder, resulting in realization of an antitheft device having an improved crime prevention performance.

Moreover, not only foaming polystyrene is formed, but also a large amount of steam (or cold air) is ejected inside the car. Therefore, it is possible to drive the intruder away by the gas, even if the intruder cannot be confined by foaming polystyrene. Furthermore, not only the motion of the intruder is blocked by foaming polystyrene or gas, but also a report to the outside (e.g. the Police) is made, so that it becomes possible to capture the intruder without delay.

Here, as a method for detecting a person who is attempting to intrude into the car, only the case where the approacher detection sensor 32 to ultrasonically detect a person who is closer to the car is used is described, but as another detection method, a method wherein whether the door was opened by a regular means or not is logically judged, based on signals from a switch for detecting a turn of a key cylinder, a switch for detecting the presence of a key in the key cylinder and a switch for detecting the opening/closing of doors, or a method wherein a break in window glass is detected using a vibration sensor, is exemplified.

Figure 5:
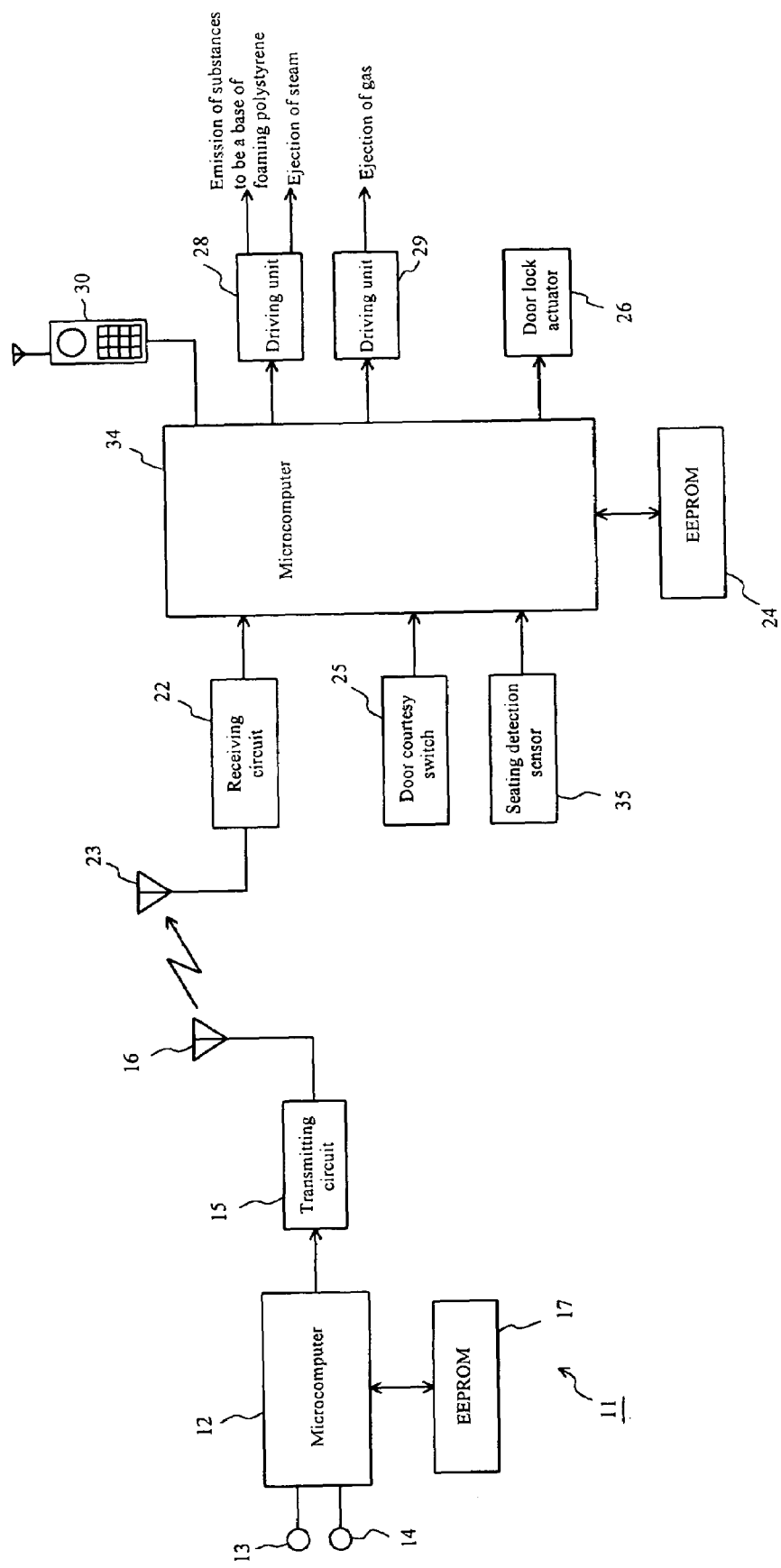
FIG. 5 is a block diagram schematically showing the principal part of an antitheft system using an antitheft device according to an embodiment (3)

FIG. 5 is a block diagram schematically showing the principal part of an antitheft system wherein an antitheft device according to an embodiment (3) is adopted. Here, the same components as those in the antitheft system shown in FIG. 1 are similarly marked and not described below.

A microcomputer 34 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 34 captures a signal from a seating detection sensor 35 to detect the seating in the driver's seat and passenger seat. Based on the signal from the seating detection sensor 35, driving units 28 and 29, and a mobile telephone 30 are controlled. Here, as the seating detection sensor 35, a method wherein the seating is detected using weight sensors embedded in the driver's seat and the like is exemplified.

Figure 6:
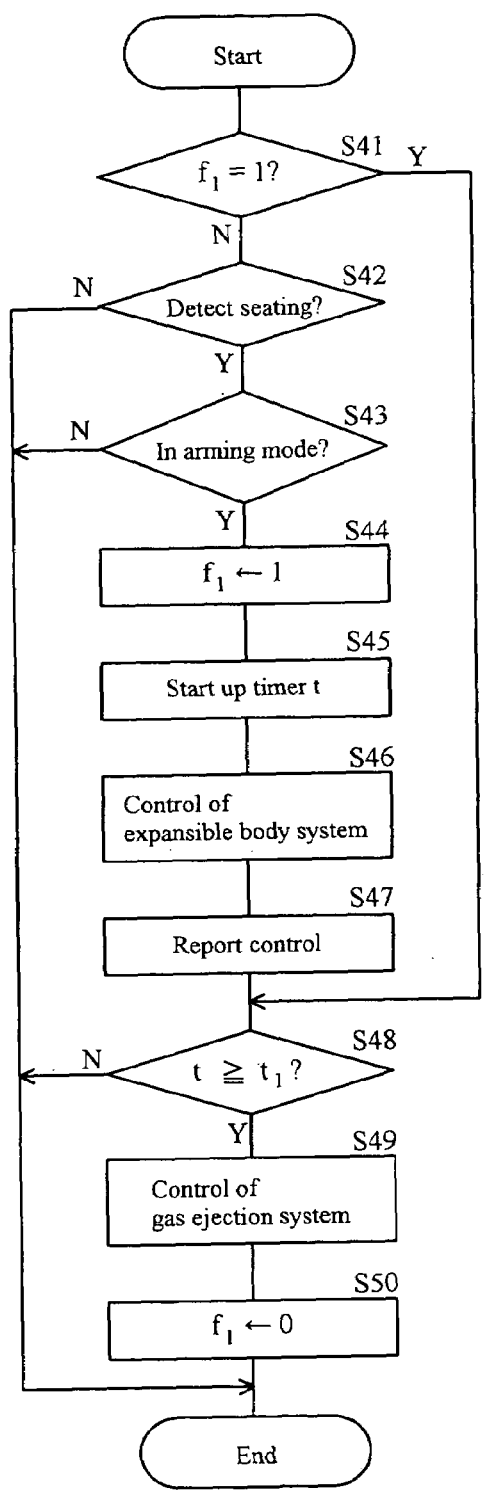
FIG. 6 is a flow chart showing the processing operation performed by a microcomputer in the antitheft system using the antitheft device according to the embodiment (3)

The processing operation ③ performed by the microcomputer 34 in the antitheft system wherein the antitheft device according to the embodiment (3) is adopted is described below by reference to a flow chart shown in FIG. 6. First, whether a flag $f_1$ showing the presence of an intruder inside the car is 1 or not is judged (Step 41). When the flag $f_1$ is judged not to be 1, whether the seating in the driver's seat or passenger seat was conducted or not is judged based on a signal from the seating detection sensor 35 (Step 42). When it is judged that the seating was conducted, whether the arming mode has been set or not is judged (Step 43). On the other hand, when it is judged that the seating is not conducted, the processing operation ③ is ended.

When it is judged that the arming mode has been set through the judgment in Step 43, the person who is sitting in the driver's seat or passenger seat is regarded as an intruder into the car (or an unauthorized person), so that the flag $f_1$ is changed to 1 (Step 44), a timer t is started up (Step 45), and the driving unit 28 is controlled so as to emit substances to be a base of foaming polystyrene around the driver's seat or passenger seat and apply steam to the substances (Step 46). Furthermore, a report to the Police is made using the mobile telephone 30 (Step 47), and then the operation goes to Step 48. On the other hand, when it is judged that the arming mode has not been set, the person who is sitting in the driver's seat or passenger seat is regarded as an authorized user and the processing operation ③ is ended at once because it is not necessary to emit the substances to be a base of foaming polystyrene.

In Step 48, whether the timer t has counted to a prescribed time $t_1$ (e.g. 10 seconds) or not is judged. When it is judged that the timer t has counted to the prescribed time $t_1$, or that the prescribed time $t_1$ has elapsed since the formation of foaming polystyrene was started, the driving unit 29 is controlled so as to eject a large amount of steam (or cold air) (Step 49), and the flag $f_1$ is returned to 0 (Step 50). On the other hand, when it is judged that the timer t has not counted to the prescribed time $t_1$, the processing operation ③ is ended at once.

By the way, when the flag $f_1$ is judged to be 1 through the judgment in Step 41, foaming polystyrene has been already formed and a report to the Police has been made, so that the operation bypasses Steps 42–47 and goes to Step 48.

Using the above antitheft device according to the embodiment (3), when the seating in the driver's seat or passenger seat is detected while the arming mode has been set, substances to be a base of foaming polystyrene are emitted around the driver's seat or passenger seat and steam is applied to the substances to expand them (for example, about 30–80 times), so that the expanded foaming polystyrene blocks the motion of an intruder, resulting in capture of the intruder.

And when the intruder is seated in the driver's seat or passenger seat, or the intruder is present in a prescribed place, foaming polystyrene blocks the motion of the intruder. Therefore, it is possible to capture the intruder with more reliability.

Moreover, not only foaming polystyrene is formed, but also a large amount of steam (or cold air) is ejected inside the car. Therefore, it is possible to drive the intruder away by the gas, even if the intruder cannot be confined by foaming polystyrene. Furthermore, not only the motion of the intruder is blocked by foaming polystyrene or gas, but also a report to the outside (e.g. the Police) is made, so that it also becomes possible to capture the intruder without delay.

In the antitheft device according to any of the embodiments (1)–(3), when an intruder is inside the car, or is seated in the driver's seat or the like, substances to be a base of foaming polystyrene are emitted around the driver's seat or passenger seat, and steam is applied to the substances, so that the motion of the intruder is blocked by foaming polystyrene. However, in an antitheft device according to another embodiment, not foaming polystyrene is formed, but an air bag or the like may be expanded.

Figure 7:
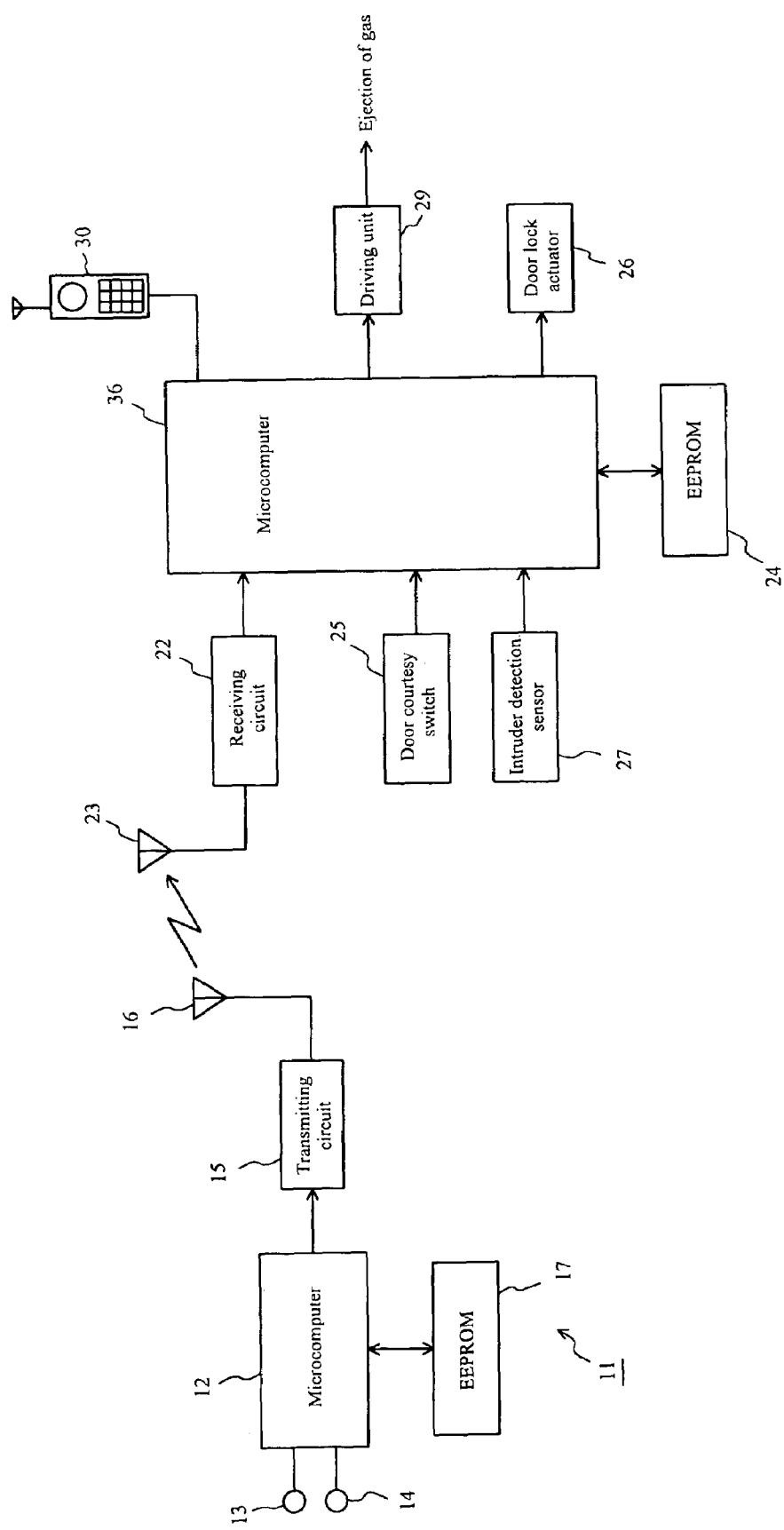
FIG. 7 is a block diagram schematically showing the principal part of an antitheft system using an antitheft device according to an embodiment (4)

FIG. 7 is a block diagram schematically showing the principal part of an antitheft system wherein an antitheft device according to an embodiment (4) is adopted. Here, the same components as those in the antitheft system shown in FIG. 1 are similarly marked and not described below.

A microcomputer 36 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 36 captures a signal from an intruder detection sensor 27 to detect an intruder into the car, in cases where the arming mode has been set. Based on the captured signal, it controls a driving unit 29 to drive a function of ejecting such a large amount of steam (or cold air) as can restrict the intruder's vision, and controls a mobile telephone 30 so as to make a report to the Police. Here, as the intruder detection sensor 27, a method wherein the motion of a person who intruded into the car is ultrasonically detected is exemplified.

Figure 8:
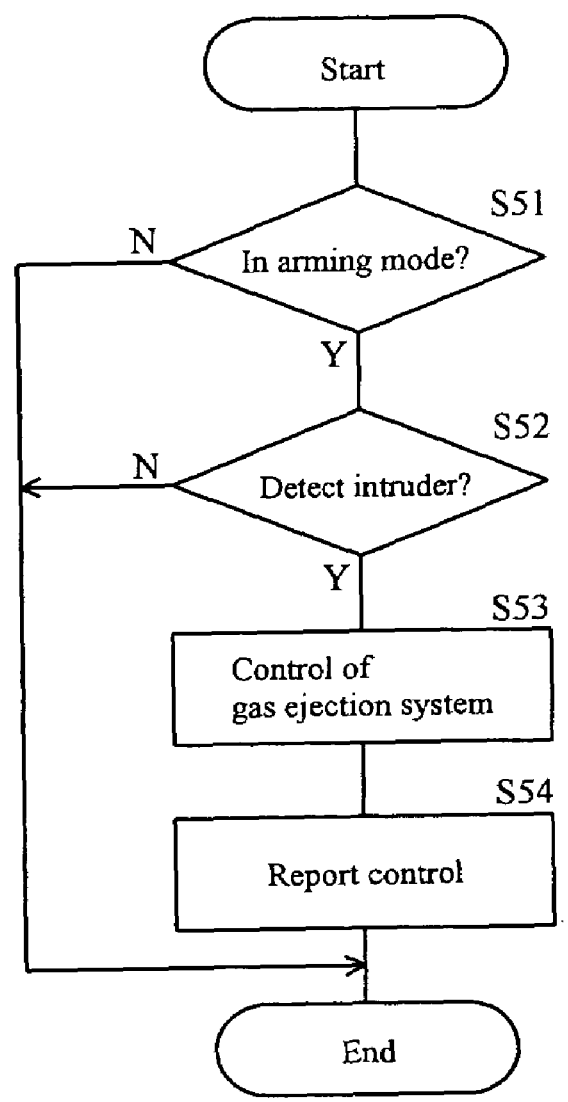
FIG. 8 is a flow chart showing the processing operation performed by a microcomputer in the antitheft system using the antitheft device according to the embodiment (4)

The processing operation ④ performed by the microcomputer 36 in the antitheft system wherein the antitheft device according to the embodiment (4) is adopted is described below by reference to a flow chart shown in FIG. 8. First, whether the arming mode has been set or not is judged (Step 51). When it is judged that the arming mode has been set, whether an intruder is inside the car or not is judged based on a signal from the intruder detection sensor 27 (Step 52).

On the other hand, when it is judged that the arming mode has not been set, the processing operation ④ is ended.

When it is judged that an intruder is inside the car through the judgment in Step 52, the driving unit 29 is controlled so as to eject a large amount of steam (or cold air) (Step 53), and furthermore, a report to the Police is made using the mobile telephone 30 (Step 54). On the other hand, when it is judged that no intruder is inside the car, the processing operation ④ is ended at once because it is not necessary to eject steam (or cold air).

Using the antitheft device according to the embodiment (4), when an intruder into the car is detected, a large amount of steam (or cold air) is ejected inside the car so as to restrict the intruder's vision or frighten the intruder. As a result, it is possible to block the motion of the intruder or drive the intruder away from the vehicle. Furthermore, not only the intruder's vision is restricted by the gas, but also a report to the outside (e.g. the Police) is made, so that it also becomes possible to capture the intruder without delay.

Figure 9:
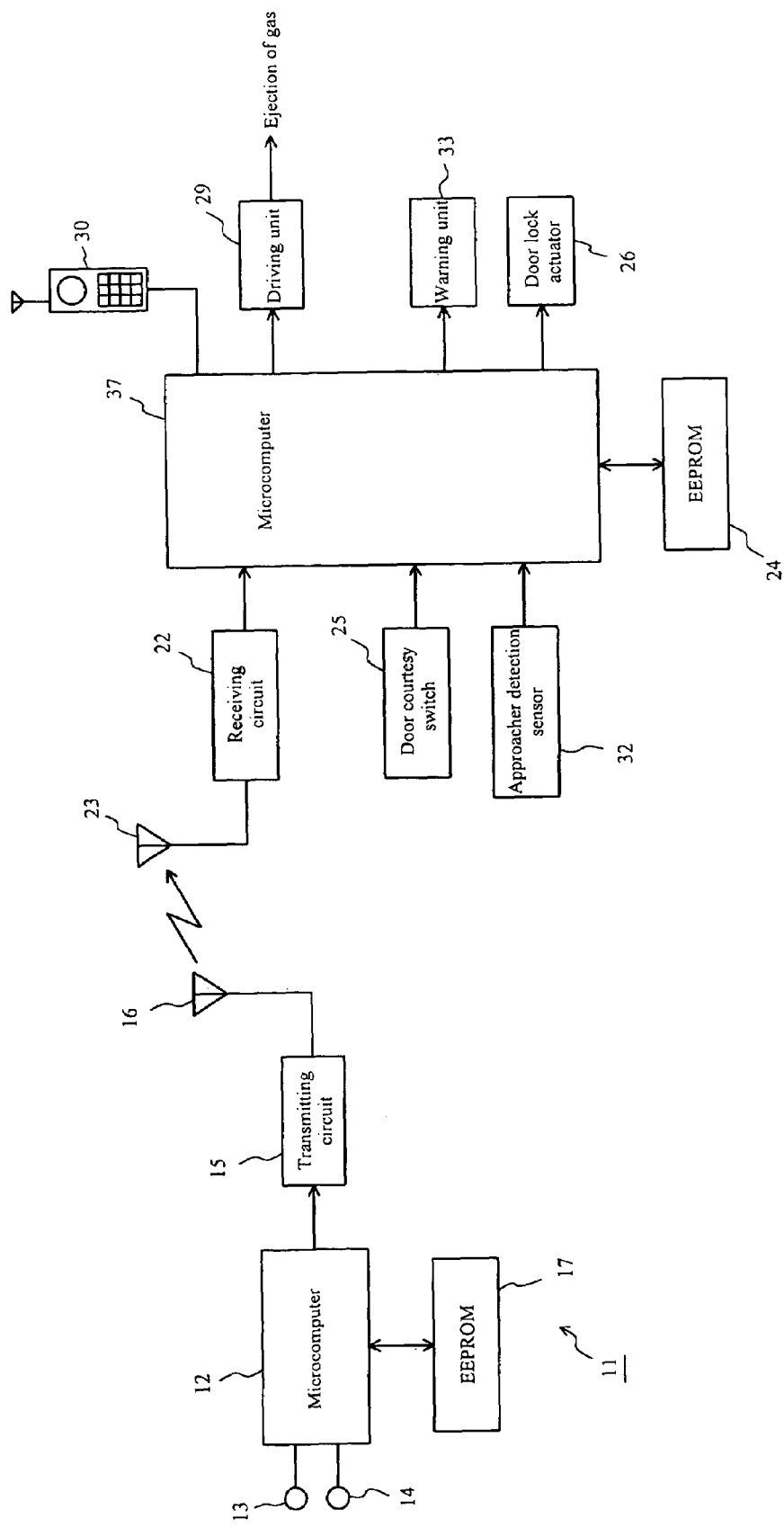
FIG. 9 is a block diagram schematically showing the principal part of an antitheft system using an antitheft device according to an embodiment (5)

FIG. 9 is a block diagram schematically showing the principal part of an antitheft system wherein an antitheft device according to an embodiment (5) is adopted. Here, the same components as those in the antitheft system shown in FIG. 1 are similarly marked and not described below.

A microcomputer 37 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 37 captures a signal from an approacher detection sensor 32 to detect a person who is attempting to intrude into the car (here, a person who is closer to the car). Based on the signal from the approacher detection sensor 32, driving units 28 and 29, a mobile telephone 30 and a warning unit 33 are controlled. Here, as the approacher detection sensor 32, a method wherein the motion of a person who is closer to the vehicle is ultrasonically detected is exemplified.

Figure 10:
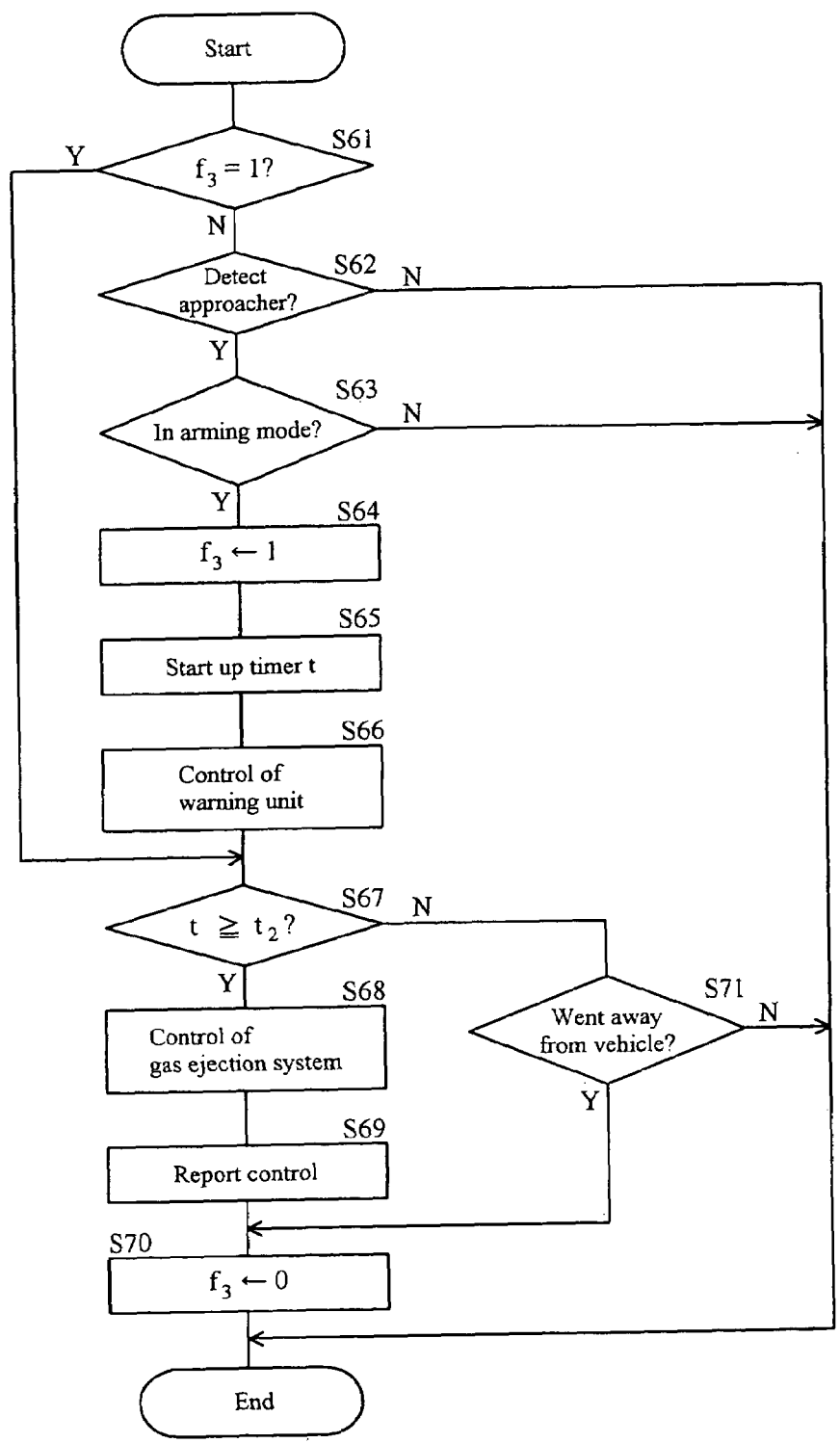
FIG. 10 is a flow chart showing the processing operation performed by a microcomputer in the antitheft system using the antitheft device according to the embodiment (5)

The processing operation ⑤ performed by the microcomputer 37 in the antitheft system wherein the antitheft device according to the embodiment (5) is adopted is described below by reference to a flow chart shown in FIG. 10. First, whether a flag $f_3$ showing the presence of an approacher to the car is 1 or not is judged (Step 61). When the flag $f_3$ is judged not to be 1, whether there is a person who is approaching the car or not is judged based on a signal from the approacher detection sensor 32 (Step 62). When it is judged that there is an approacher, whether the arming mode has been set or not is judged (Step 63). On the other hand, when it is judged that there is no approacher, the processing operation ⑤ is ended.

When it is judged that the arming mode has been set through the judgment in Step 63, the flag $f_3$ is changed to 1 (Step 64), a timer t is started up (Step 65), the warning unit 33 is controlled so as to sound a warning buzzer (Step 66), and then whether the timer t has counted to a prescribed time $t_2$ (e.g. 10 seconds) or not is judged (Step 67). On the other hand, when it is judged that the arming mode has not been set, the processing operation ⑤ is ended.

When it is judged that the timer t has counted to the prescribed time $t_2$ through the judgment in Step 67, it is concluded that a person who was closer to the car intruded into the car and has been seated in the driver's seat or passenger seat, and the driving unit 29 is controlled so as to eject a large amount of steam (or cold air) (Step 68). Furthermore, a report to the Police is made using the mobile telephone 30 (Step 69), and the flag $f_3$ is returned to 0 (Step 70).

By the way, when it is judged that the timer t has not counted to the prescribed time $t_2$ through the judgment in Step 67, whether a person who was closer to the vehicle has gone away from the vehicle or not is judged based on a signal from the approacher detection sensor 32 (Step 71). When the approacher is judged to have gone away from the vehicle, the flag $f_3$ is returned to 0 because it is not necessary to eject steam (or cold air) (Step 70). On the other hand, when the approacher is judged not to have gone away from the vehicle, the processing operation ⑤ is ended at once.

And when the flag $f_3$ is judged to be 1 through the judgment in Step 61, the approacher to the vehicle has been already detected and a warning buzzer has been sounded, so that the operation bypasses Steps 62–66 and goes to Step 67.

Using the antitheft device according to the embodiment (5), when the prescribed time $t_2$ (for example, a time which a person who attempts to steal a car may require between the approach to the car and the seating in the driver's seat or passenger seat) elapses after a person who is attempting to intrude into the car (for example, a person who is closer to the car) is detected while the arming mode has been set, a large amount of steam (or cold air) is ejected inside the car so as to restrict the intruder's vision to drive the intruder away.

That is, at the timing when the person who attempts to steal the car may be seated in the driver's seat or passenger seat, steam (or cold air) is ejected inside the car so as to restrict the intruder's vision or frighten the intruder. As a result, it becomes possible to block the motion of the intruder or drive the intruder away from the car, leading to realization of an antitheft device having an improved crime prevention performance. Furthermore, not only the motion of the intruder is blocked by the gas, but also a report to the outside (e.g. the Police) is made, so that it also becomes possible to capture the intruder without delay.

Figure 11:
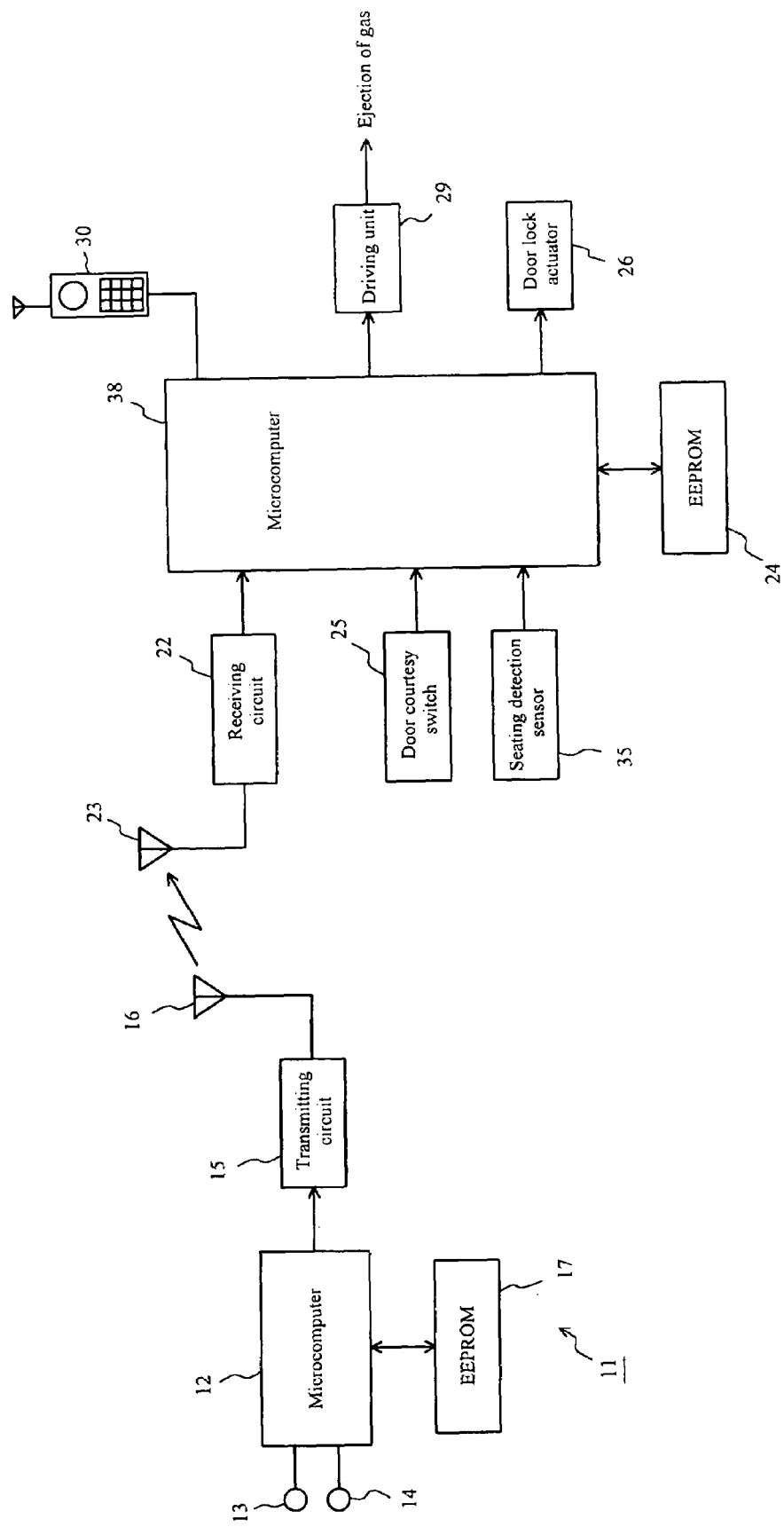
FIG. 11 is a block diagram schematically showing the principal part of an antitheft system using an antitheft device according to an embodiment (6)

FIG. 11 is a block diagram schematically showing the principal part of an antitheft system wherein an antitheft device according to an embodiment (6) is adopted. Here, the same components as those in the antitheft system shown in FIG. 1 are similarly marked and not described below.

A microcomputer 38 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 38 captures a signal from a seating detection sensor 35 to detect the seating in the driver's seat and passenger seat. Based on the signal from the seating detection sensor 35, a driving unit 29 and a mobile telephone 30 are controlled. Here, as the seating detection sensor 35, a method wherein the seating is detected using weight sensors embedded in the driver's seat and the like is exemplified.

Figure 12:
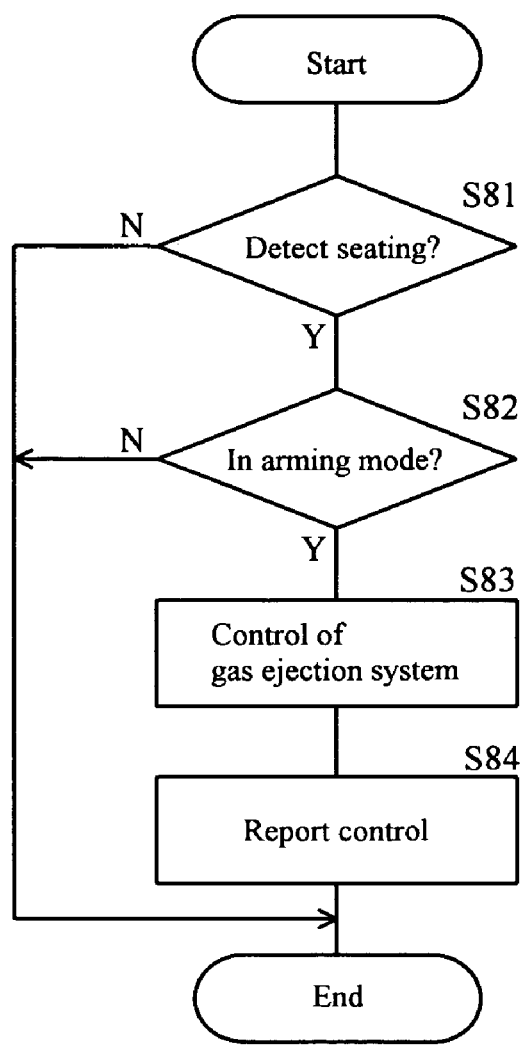
FIG. 12 is a flow chart showing the processing operation performed by a microcomputer in the antitheft system using the antitheft device according to the embodiment (6)

The processing operation ⑥ performed by the microcomputer 38 in the antitheft system wherein the antitheft device according to the embodiment (6) is adopted is described below by reference to a flow chart shown in FIG. 12. First, whether the seating in the driver's seat or passenger seat was conducted or not is judged based on a signal from the seating detection sensor 35 (Step 81). When it is judged that the seating was conducted, whether the arming mode has been set or not is judged (Step 82). On the other hand, when it is judged that the seating is not conducted, the processing operation ⑥ is ended.

When it is judged that the arming mode has been set through the judgment in Step 82, the person who is sitting in the driver's seat or passenger seat is regarded as an intruder into the car (or an unauthorized person), so that the driving unit 29 is controlled so as to eject a large amount of steam (or cold air) (Step 83), and furthermore, a report to the Police is made using the mobile telephone 30 (Step 84). On the other hand, when it is judged that the arming mode has not been set, the person who is sitting in the driver's seat or passenger seat is regarded as an authorized user and the processing operation ⑥ is ended at once because it is not necessary to eject steam (or cold air).

Using the antitheft device according to the embodiment (6), when the seating in the driver's seat or passenger seat is detected while the arming mode has been set, a large amount of steam (or cold air) is ejected inside the car so as to restrict the intruder's vision or frighten the intruder. As a result, it becomes possible to block the motion of the intruder or drive the intruder away from the vehicle. Furthermore, not only the motion of the intruder is blocked by the gas, but also a report to the outside (e.g. the Police) is made, so that it also becomes possible to capture the intruder without delay.

Figure 13:
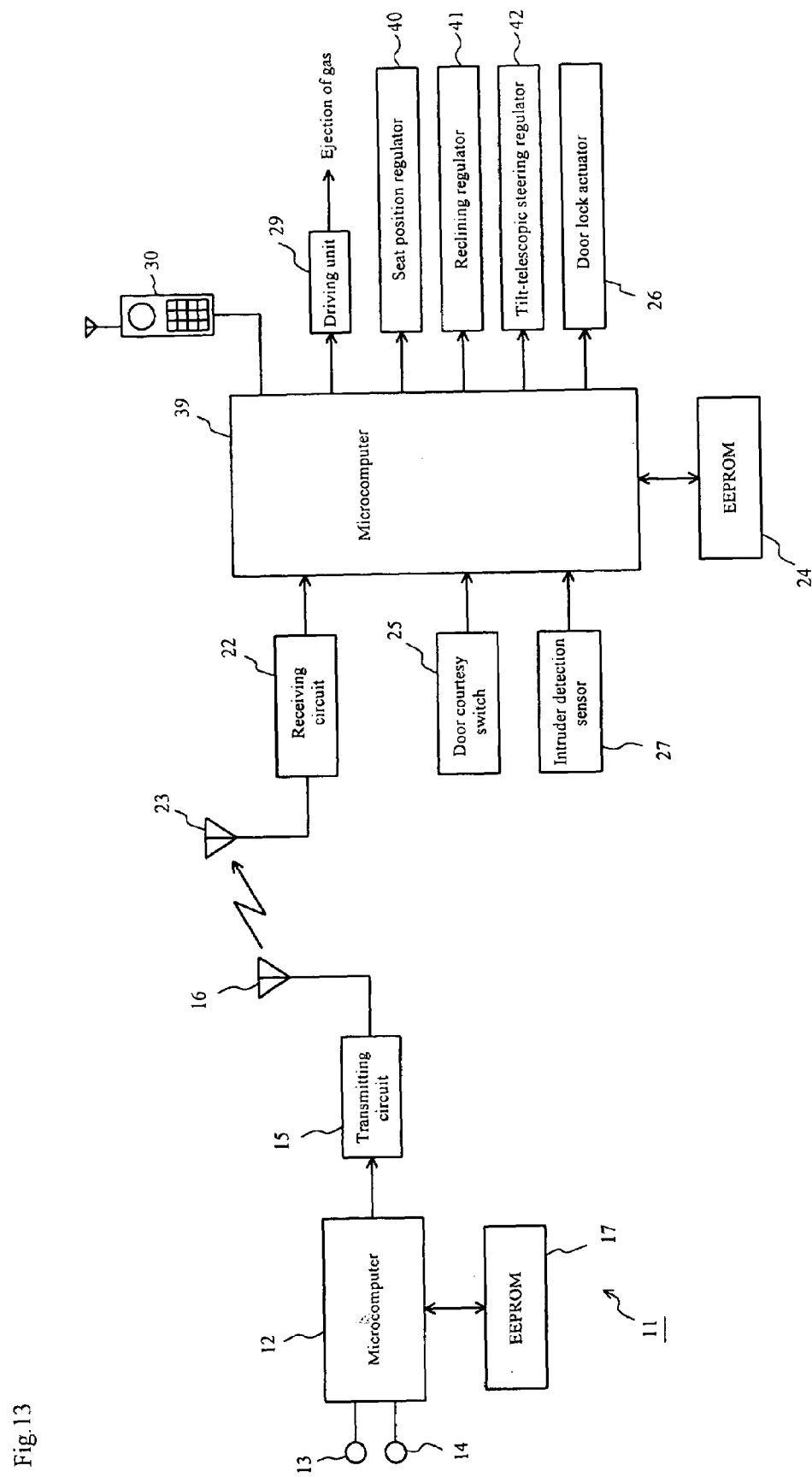
FIG. 13 is a block diagram schematically showing the principal part of an antitheft system using an antitheft device according to an embodiment (7)

FIG. 13 is a block diagram schematically showing the principal part of an antitheft system wherein an antitheft device according to an embodiment (7) is adopted. Here, the same components as those in the antitheft system shown in FIG. 1 are similarly marked and not described below.

A microcomputer 39 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 39 captures a signal from an intruder detection sensor 27 to detect an intruder into the car while the arming mode has been set. Based on the captured signal, a driving unit 29, a mobile telephone 30, a seat position regulator 40, a reclining regulator 41 and a tilt-telescopic steering regulator 42 are controlled. Here, as the intruder detection sensor 27, a method wherein the motion of a person who intruded into the car is ultrasonically detected is exemplified.

The seat position regulator 40 slides a seat in forward and reverse, the reclining regulator 41 adjusts the tilt angle of the backrest portion of the seat, and the tilt-telescopic steering regulator 42 adjusts the angle and length of a steering wheel (or the gap from a person sitting in the driver's seat).

Figure 14:
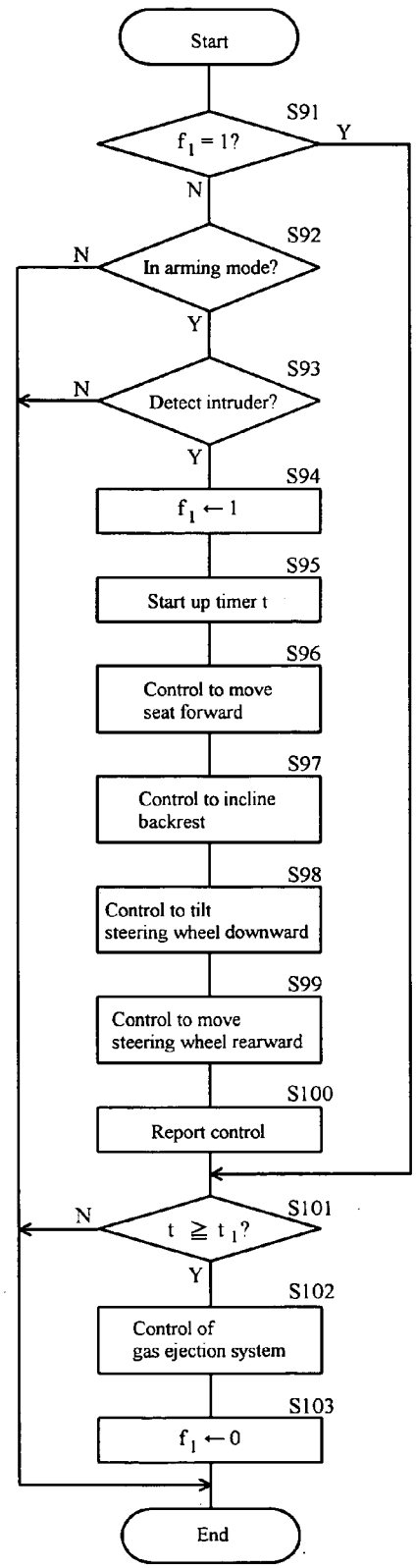
FIG. 14 is a flow chart showing the processing operation performed by a microcomputer in the antitheft system using the antitheft device according to the embodiment (7)

The processing operation ⑦ performed by the microcomputer 39 in the antitheft system wherein the antitheft device according to the embodiment (7) is adopted is described below by reference to a flow chart shown in FIG. 14. First, whether a flag $f_1$ showing the presence of an intruder inside the car is 1 or not is judged (Step 91). When the flag $f_1$ is judged not to be 1, whether the arming mode has been set or not is judged (Step 92). When it is judged that the arming mode has been set, whether an intruder is inside the car or not is judged based on a signal from the intruder detection sensor 27 (Step 93). On the other hand, when it is judged that the arming mode has not been set, the processing operation ⑦ is ended.

Figure 15:
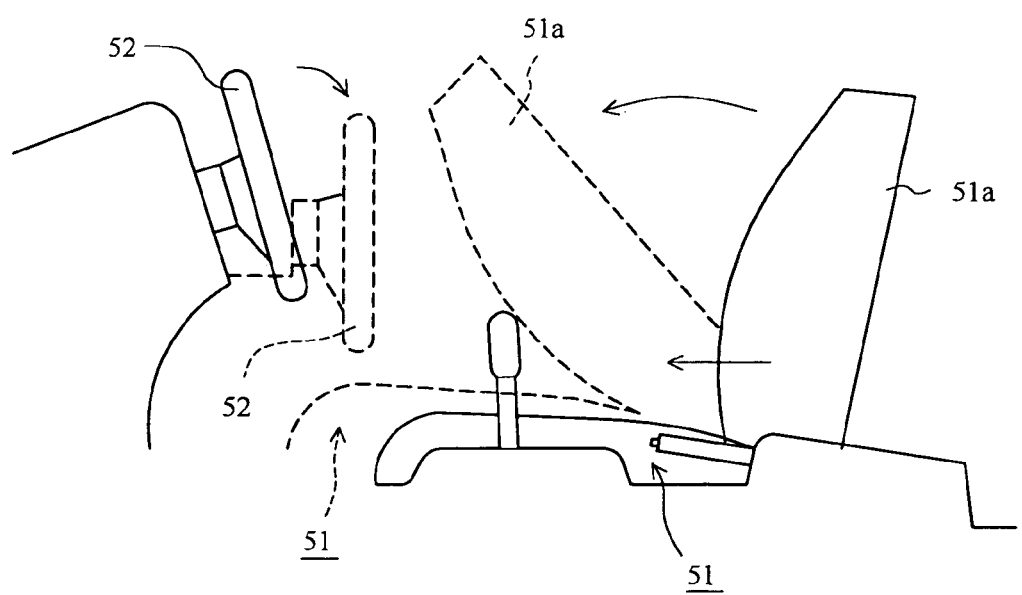
FIG. 15 is a diagrammatic illustration for descriptions of the position changing of a seat or a steering wheel in the antitheft system using the antitheft device according to the embodiment (7)

When it is judged that an intruder is inside the car through the judgment in Step 93, the flag $f_1$ is changed to 1 (Step 94), a timer t is started up (Step 95), the seat position regulator 41 is controlled so as to slide a seat 51 forward so that the seat 51 is placed in the closest position to a steering wheel 52 as shown in FIG. 15 (Step 96), the reclining regulator 41 is controlled so as to incline the backrest portion 51a of the seat 51 forward to the utmost limit (Step 97), and the tilt-telescopic steering regulator 42 is controlled so as to tilt the steering wheel 52 downward to the utmost limit and make the gap from the seat 51 smaller (Steps 98 and 99).

Furthermore, a report to the Police is made using the mobile telephone 30 (Step 100), and then the operation goes to Step 101. On the other hand, when it is judged that no intruder is inside the car through the judgment in Step 93, the processing operation ⑦ is ended at once because it is not necessary to change the position of the seat 51 and the like.

In Step 101, whether the timer t has counted to a prescribed time $t_1$ (e.g. 20 seconds) or not is judged. When it is judged that the timer t has counted to the prescribed time $t_1$, or that the prescribed time $t_1$ has elapsed since the regulation of the position of the seat 51 was started, the driving unit 29 is controlled so as to eject a large amount of steam (or cold air) (Step 102), and the flag $f_1$ is returned to 0 (Step 103). On the other hand, when it is judged that the timer t has not counted to the prescribed time $t_1$, the processing operation ⑦ is ended at once.

By the way, when the flag $f_1$ is judged to be 1 through the judgment in Step 91, the positions of the seat 51 and the steering wheel 52 have been already changed and a report to the Police has been made, so that the operation bypasses Steps 92–100 and goes to Step 101.

Using the antitheft device according to the embodiment (7), when an intruder into the car is detected, the seat 51 is caused to slide forward, the backrest portion 51a thereof is caused to incline forward, and the steering wheel 52 is caused to tilt downward and the gap from the seat 51 is made smaller, so as to block the motion of the intruder. As a result, it becomes possible to capture the intruder, leading to realization of an antitheft device having an improved crime prevention performance.

Moreover, not only the positions of the seat 51 and the steering wheel 52 are changed, but also a large amount of steam (or cold air) is ejected inside the car. Therefore, it is possible to drive the intruder away by the gas, even if the intruder cannot be confined by changing the positions of the seat 51 and the like. Furthermore, not only the motion of the intruder is blocked by the changes of the seat position and the like or the gas, but also a report to the outside (e.g. the Police) is made, so that it also becomes possible to capture the intruder without delay.

Figure 16:
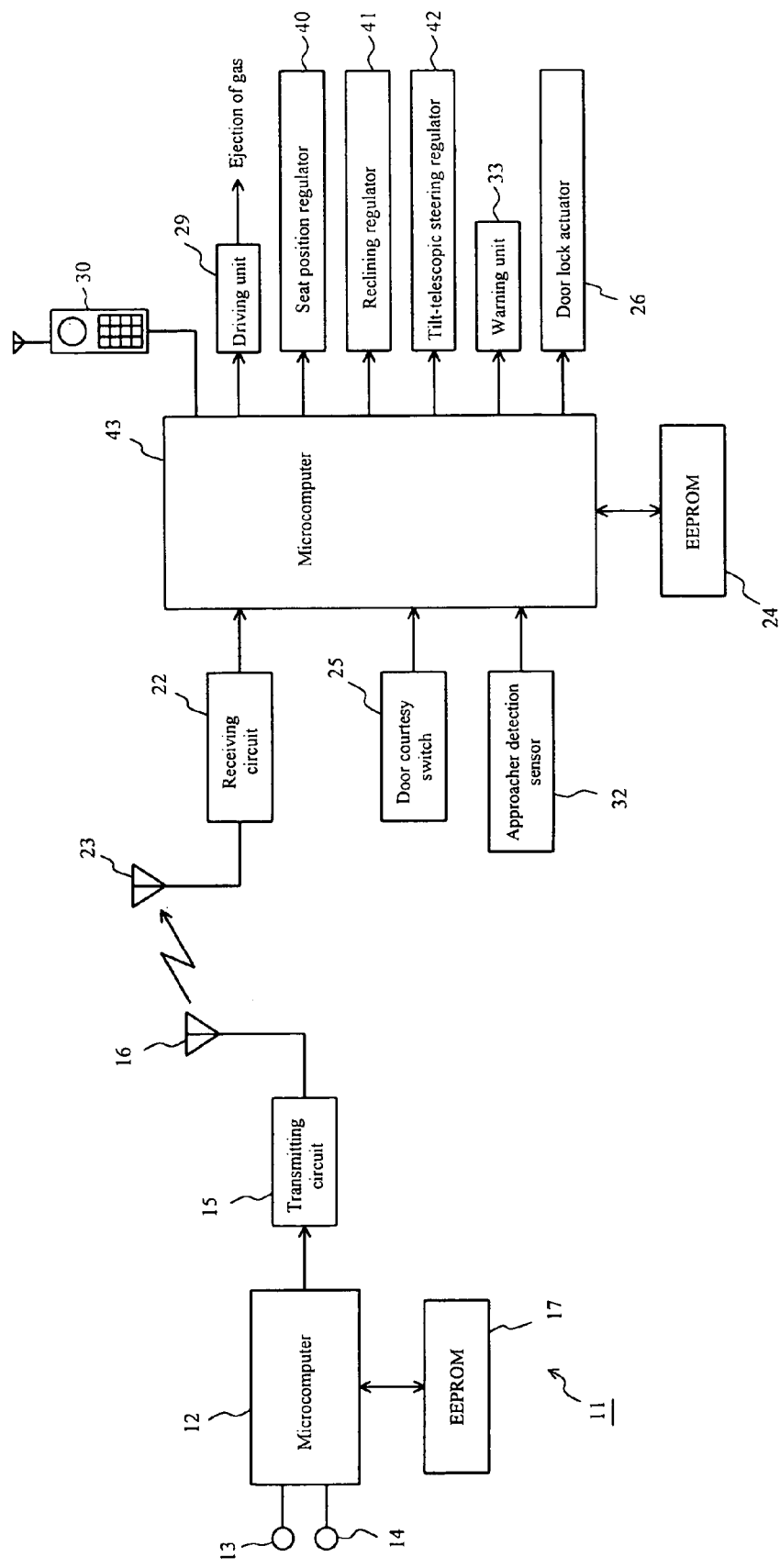
FIG. 16 is a block diagram schematically showing the principal part of an antitheft system using an antitheft device according to an embodiment (8)

FIG. 16 is a block diagram schematically showing the principal part of an antitheft system wherein an antitheft device according to an embodiment (8) is adopted. Here, the same components as those in the antitheft system shown in FIG. 13 are similarly marked and not described below.

A microcomputer 43 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 43 captures a signal from an approacher detection sensor 32 to detect a person who is attempting to intrude into the car (here, a person who is closer to the car). Based on the signal from the approacher detection sensor 32, a driving unit 29, a mobile telephone 30, a warning unit 33, a seat position regulator 40, a reclining regulator 41 and a tilt-telescopic steering regulator 42 are controlled. Here, as the approacher detection sensor 32, a method wherein the motion of a person who is closer to the car is ultrasonically detected is exemplified.

Figure 17:
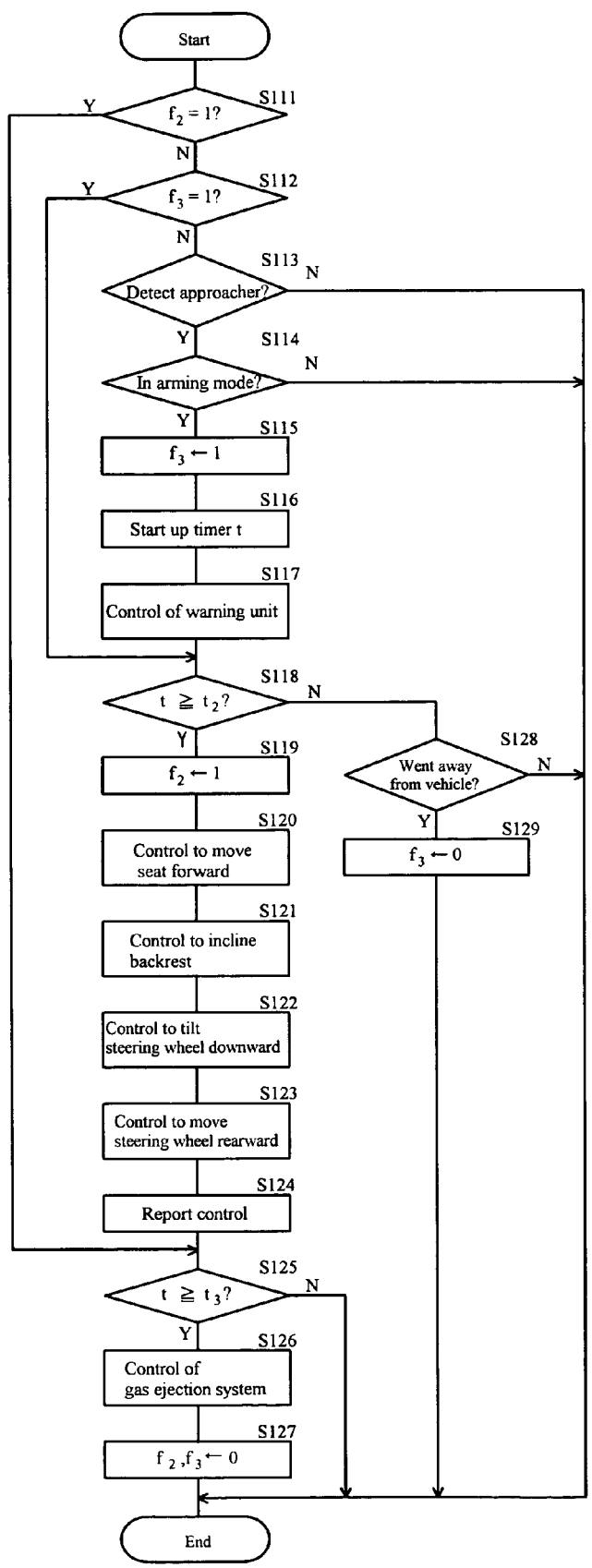
FIG. 17 is a flow chart showing the processing operation performed by a microcomputer in the antitheft system using the antitheft device according to the embodiment (8)

The processing operation ⑧ performed by the microcomputer 43 in the antitheft system wherein the antitheft device according to the embodiment (8) is adopted is described below by reference to a flow chart shown in FIG. 17. First, whether a flag $f_2$ showing that it is concluded that an intruder is inside the car (see the below-described Step 119) is 1 or not is judged (Step 111). When the flag $f_2$ is judged not to be 1, whether a flag $f_3$ showing the presence of an approacher to the car is 1 or not is judged (Step 112).

When the flag $f_3$ is judged not to be 1, whether there is a person who is approaching the car or not is judged based on a signal from the approacher detection sensor 32 (Step 113). When it is judged that there is an approacher, whether the arming mode has been set or not is judged (Step 114). On the other hand, when it is judged that there is no approacher, the processing operation ⑧ is ended.

When it is judged that the arming mode has been set through the judgment in Step 114, the flag $f_3$ is changed to 1 (Step 115), a timer t is started up (Step 116), the warning unit 33 is controlled so as to sound a warning buzzer (Step 117), and then whether the timer t has counted to a prescribed time $t_2$ (e.g. 10 seconds) or not is judged (Step 118). On the other hand, when it is judged that the arming mode has not been set, the processing operation ⑧ is ended.

When it is judged that the timer t has counted to the prescribed time $t_2$ through the judgment in Step 118, it is concluded that a person who was closer to the car intruded into the car and has been seated in the driver's seat or passenger seat and the flag $f_2$ is changed to 1 (Step 119). The seat position regulator 41 is controlled so as to slide a seat 51 forward so that the seat 51 is placed in the closest position to a steering wheel 52 as shown in FIG. 15 (Step 120), the reclining regulator 41 is controlled so as to incline the backrest portion 51a of the seat 51 forward to the utmost limit (Step 121), and the tilt-telescopic steering regulator 42 is controlled so as to tilt the steering wheel 52 downward to the utmost limit and make the gap from the seat 51 smaller (Steps 122 and 123). Furthermore, a report to the Police is made using the mobile telephone 30 (Step 124), and then the operation goes to Step 125.

In Step 125, whether the timer t has counted to a prescribed time $t_3$ (e.g. 30 seconds) or not is judged. When it is judged that the timer t has counted to the prescribed time $t_3$, or that a prescribed time $t_1$ ($=t_3-t_2$) has elapsed since the regulation of the seat position was started, the driving unit 29 is controlled so as to eject a large amount of steam (or cold air) (Step 126), and the flags $f_2$ and $f_3$ are returned to 0 (Step 127). On the other hand, when it is judged that the timer t has not counted to the prescribed time $t_3$, the processing operation ⑧ is ended at once.

By the way, when it is judged that the timer t has not counted to the prescribed time $t_2$ through the judgment in Step 118, whether a person who was closer to the vehicle has gone away from the vehicle or not is judged based on a signal from the approacher detection sensor 32 (Step 128). When it is judged that the approacher has gone away from the vehicle, the flag $f_3$ is returned to 0 because it is not necessary to change the position of the seat and the like (Step 129). On the other hand, when it is judged that the approacher has not gone away from the vehicle, the processing operation ⑧ is ended at once.

When the flag $f_3$ is judged to be 1 through the judgment in Step 112, the approacher to the vehicle has been already detected and a warning buzzer has been made, so that the operation bypasses Steps 113–117 and goes to Step 118. When the flag $f_2$ is judged to be 1 through the judgment in Step 111, the positions of the seat and the steering wheel have been already changed and a report to the Police has been made, so that the operation bypasses Steps 112–124 and goes to Step 125.

Using the antitheft device according to the embodiment (8), when the prescribed time $t_2$ (e.g. a time which a person who attempts to steal a car may require between the approach to the car and the seating in the driver's seat or passenger seat) elapses since a person who is attempting to intrude into the car (e.g. a person who is closer to the car) is detected while the arming mode has been set, by sliding the seat 51 forward, inclining the backrest portion 51a thereof forward, and tilting the steering wheel 52 downward and making the gap from the seat 51 smaller so as to block the motion of the intruder, it is possible to capture the intruder.

That is, at the timing when a person who attempts to steal the vehicle may be seated in the driver's seat or passenger seat, the positions of the seat 51 and the steering wheel 52 are changed. As a result, by blocking the motion of the intruder, it becomes possible to capture the intruder, leading to realization of an antitheft device having an improved crime prevention performance.

Moreover, not only the positions of the seat 51 and the steering wheel 52 are changed, but also a large amount of steam (or cold air) is ejected inside the car. Therefore, it is possible to drive the intruder away by the gas, even if the intruder cannot be confined by changing the positions of the seat 51 and the like. Furthermore, not only the motion of the intruder is blocked by the changes of the seat position and the like or the gas, but also a report to the outside (e.g. the Police) is made, so that it also becomes possible to capture the intruder without delay.

Figure 18:
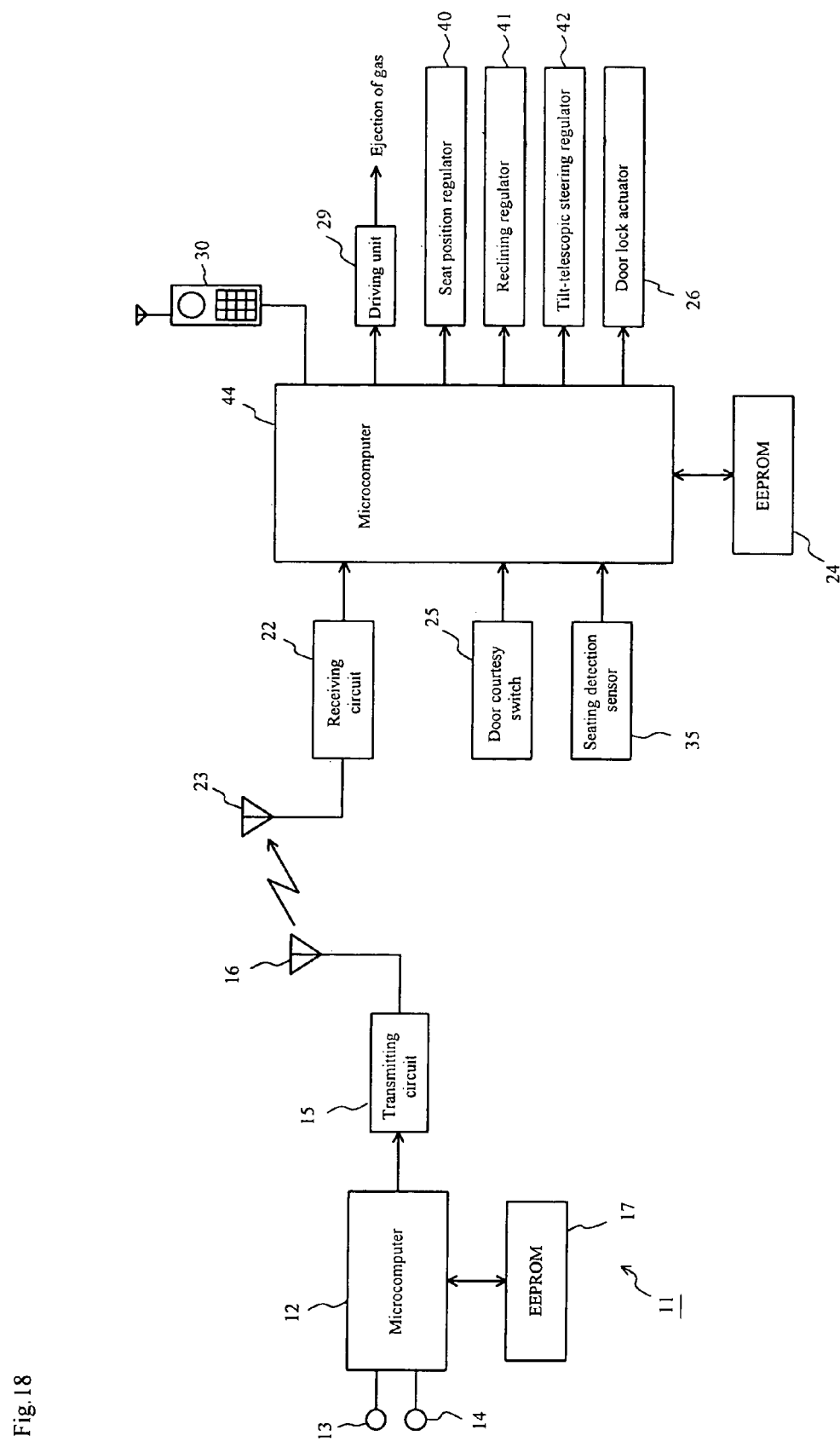
FIG. 18 is a block diagram schematically showing the principal part of an antitheft system using an antitheft device according to an embodiment (9)

FIG. 18 is a block diagram schematically showing the principal part of an antitheft system wherein an antitheft device according to an embodiment (9) is adopted. Here, the same components as those in the antitheft system shown in FIG. 13 are similarly marked and not described below.

A microcomputer 44 constituting the main body of the antitheft system, judges whether or not an ID code included in a signal (an ID code+a door locking command code) received through an antenna 23 and a receiving circuit 22 is identical to an ID code stored in an EEPROM 24. When they are the same, the processing corresponding to the door locking command code included in the signal and a signal from a door courtesy switch 25 to detect the open/closed state of doors is performed.

And the microcomputer 44 captures a signal from a seating detection sensor 35 to detect the seating in the driver's seat or passenger seat. Based on the signal from the seating detection sensor 35, a driving unit 29, a mobile telephone 30, a seat position regulator 40, a reclining regulator 41 and a tilt-telescopic steering regulator 42 are controlled. Here, as the seating detection sensor 35, a method wherein the seating is detected using weight sensors embedded in the driver's seat and the like is exemplified.

Figure 19:
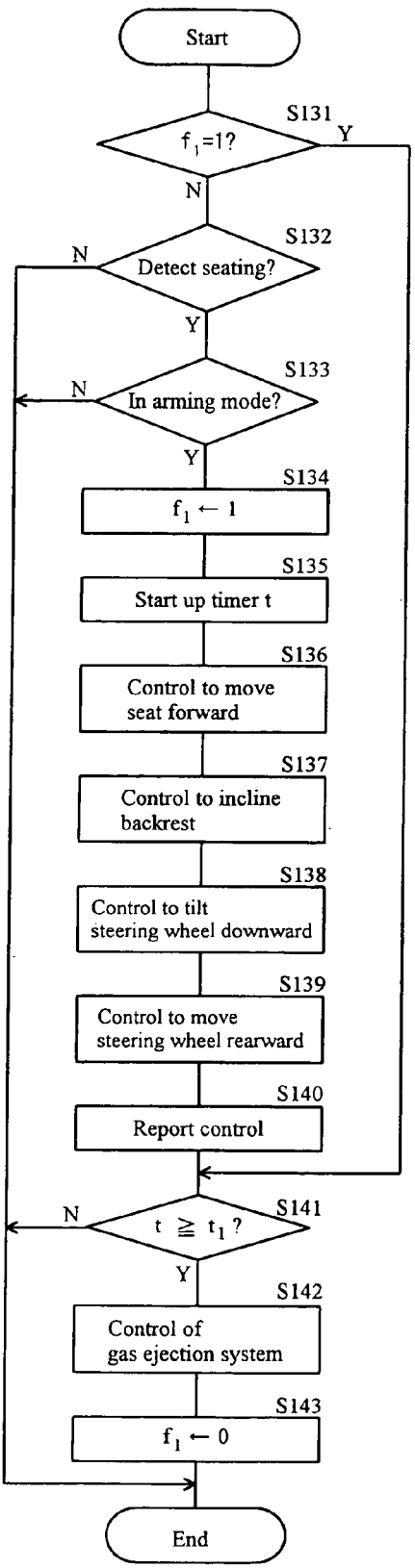
FIG. 19 is a flow chart showing the processing operation performed by a microcomputer in the antitheft system using the antitheft device according to the embodiment (9).

The processing operation ⑨ performed by the microcomputer 44 in the antitheft system wherein the antitheft device according to the embodiment (9) is adopted is described below by reference to a flow chart shown in FIG. 19. First, whether a flag $f_1$ showing the presence of an intruder inside the car is 1 or not is judged (Step 131). When the flag $f_1$ is judged not to be 1, whether the seating in the driver's seat or passenger seat was conducted or not is judged based on a signal from the seating detection sensor 35 (Step 132). When it is judged that the seating was conducted, whether the arming mode has been set or not is judged (Step 133). On the other hand, when it is judged that the seating is not conducted, the processing operation ⑨ is ended.

When it is judged that the arming mode has been set through the judgment in Step 133, a person who is sitting in the driver's seat or passenger seat is regarded as an intruder into the car (or an unauthorized person), so that the flag $f_1$ is changed to 1 (Step 134), a timer t is started up (Step 135), the seat position regulator 41 is controlled so as to slide a seat 51 forward so that the seat 51 is placed in the closest position to a steering wheel 52 as shown in FIG. 15 (Step 136), the reclining regulator 41 is controlled so as to incline the backrest portion 51a of the seat 51 forward to the utmost limit (Step 137), and the tilt-telescopic steering regulator 42 is controlled so as to tilt the steering wheel 52 downward to the utmost limit and make the gap from the seat 51 smaller (Steps 138 and 139).

Furthermore, a report to the Police is made using the mobile telephone 30 (Step 140), and then the operation goes to Step 141. On the other hand, when it is judged that the arming mode has not been set, the person who is sitting in the driver's seat or passenger seat is regarded as an authorized user, and the processing operation ⑨ is ended at once because it is not necessary to change the position of the seat and the like.

In Step 141, whether the timer t has counted to a prescribed time $t_1$ (e.g. 10 seconds) or not is judged. When it is judged that the timer t has counted to the prescribed time $t_1$, or that the prescribed time $t_1$ has elapsed since the regulation of the seat position was started, the driving unit 29 is controlled so as to eject a large amount of steam (or cold air) (Step 142), and the flag $f_1$ is returned to 0 (Step 143). On the other hand, when it is judged that the timer t has not counted to the prescribed time $t_1$, the processing operation ⑨ is ended at once.

By the way, when the flag $f_1$ is judged to be 1 through the judgment in Step 131, the positions of the seat and the steering wheel have been already changed and a report to the Police has been made, so that the operation bypasses Steps 132–140 and goes to Step 141.

Using the antitheft device according to the embodiment (9), when the seating in the driver's seat or passenger seat is detected while the arming mode has been set, by sliding the seat 51 forward, inclining the backrest portion 51a thereof forward, and tilting the steering wheel 52 downward and making the gap from the seat 51 smaller so as to block the motion of the intruder, it becomes possible to capture the intruder, leading to realization of an antitheft device having an improved crime prevention performance. And the positions of the seat 51 and the steering wheel 52 are changed at a time when the intruder is seated in the driver's seat or the like, so that the intruder can be captured with more reliability.

Moreover, not only the positions of the seat 51 and the steering wheel 52 are changed, but also a large amount of steam (or cold air) is ejected inside the car. Therefore, it is possible to drive the intruder away by the gas, even if the intruder cannot be confined by the changes of the positions of the seat 51 and the like. Furthermore, not only the motion of the intruder is blocked by the changes of the seat position and the like or the gas, but also a report to the outside (e.g. the Police) is made, so that it also becomes possible to capture the intruder without delay.

In the antitheft device according to any of the embodiments (7)–(9), when an intruder is inside the car or is seated in the driver's seat or the like, the positions of the seat 51 and the steering wheel 52 are changed and gas is ejected, but in an antitheft device according to another embodiment, a function of emitting substances to be a base of foaming polystyrene around the seat 51 and applying steam to the substances, or a function of expanding an air bag or the like may be combined, besides those crime prevention functions.

And in an antitheft device according to another embodiment, by connecting a selection switch to the microcomputer 21, 31, 34, 36–39, 43 or 44, the user may be able to decide whether the above crime prevention functions are operated or not, resulting in a very convenient system for the user.

In an antitheft device according to still another embodiment, by combining at least two functions from among the above crime prevention functions, the user may be able to freely select functions which the user wants to utilize from among these multiple functions mounted.

INDUSTRIAL APPLICABILITY

The present invention relates to an antitheft device, which can prevent thefts of vehicles, electrical equipment mounted on vehicles, money and articles left inside vehicles and the like, and can-be utilized mainly in the automobile industry.

The invention claimed is:

1. An antitheft device, which is mounted on a vehicle having an expansible body system to expand an expansible body in a prescribed space inside the vehicle, said antitheft device comprising:
   an intruder detector operable to detect the presence of an intruder inside the vehicle; and
   a controller operable to control a driving unit of the expansible body system so as to expand the expansible body when the presence of an intruder inside the vehicle is detected by said intruder detector;
   wherein said controller is to be connected to a driving unit of a gas ejection system, and is operable to control the driving unit of the gas ejection system so as to eject a gas inside the vehicle; and
   wherein the driving unit of the gas ejection system is controlled so as to eject the gas inside the vehicle when a first predetermined condition of an elapse of a preset time is met after a condition for expanding the expansible body is met.

2. An antitheft device according to claim 1, wherein:
   said intruder detector detects the seating of a passenger; and
   said controller concludes that an intruder is seated, when the seating of a passenger is detected while a second predetermined condition of a security system being set is met, and controls the driving unit of the expansible body system so as to expand the expansible body.

3. An antitheft device according to claim 1, wherein the driving unit of the expansible body system emits a substance which is a base of foaming polystyrene inside the vehicle and applies steam to the emitted substance.

4. An antitheft device according to claim 1, wherein the expansible body system is an air bag system.

5. An antitheft device according to claim 1, further comprising:
a reporting unit operable to make a report to the outside; and
a first report controller operable to control said reporting unit so as to make a report to the outside when a condition for expanding the expansible body is met.

6. An antitheft device, which is mounted on a vehicle having a seat state changing system to change the state of a seat placed inside the vehicle, said antitheft device comprising:
an intruder detector operable to detect the presence of an intruder inside the vehicle; and
a controller operable to control a driving unit of the seat state changing system so as to change the state of the seat into a first prescribed state so that the motion of an intruder is blocked when the presence of the intruder inside the vehicle is detected by said intruder detector;
wherein said controller is to be connected to a driving unit of a gas ejection system, and is operable to control the driving unit of the gas ejection system so as to eject a gas inside the vehicle; and
wherein the driving unit of the gas ejection system is controlled so as to eject the gas inside the vehicle when a first predetermined condition of an elapse of a preset time is met after a condition for changing the state of the seat into the first prescribed state is met.

7. An antitheft device according to claim 6, wherein:
said intruder detector detects the seating of a passenger; and
said controller concludes that an intruder is seated, when the seating of a passenger is detected while a second predetermined condition of a security system being set is met, and controls the driving unit of the seat state changing system so as to change the state of the seat into the first prescribed state so that the motion of the intruder is blocked.

8. An antitheft device according to claim 6, wherein the first prescribed state is the state of the seat being moved forward in the vehicle, and/or the backrest portion of the seat being inclined forward in the vehicle.

9. An antitheft device according to claim 6,
wherein said controller is to be connected to a driving unit of a steering state changing system, and is operable to control the driving unit of the steering state changing system so as to change a state of the steering; and
wherein the driving unit of the steering state changing system is controlled so as to change a state of the steering into a second prescribed state so that the motion of an intruder is blocked when a condition for changing the state of the seat into the first prescribed state is met.

10. An antitheft device according to claim 9, wherein the second prescribed state is the state of the steering being tilted downward, and/or the steering being protruded rearward in the vehicle.

11. An antitheft device according to claim 6,
wherein said controller is to be connected to a driving unit of an expansible body system, and is operable to control the driving unit so as to expand an expansible body in a prescribed space inside the vehicle; and
wherein the driving unit of the expansible body system is controlled so as to expand the expansible body when a condition for changing the state of the seat into the first prescribed state is met.

12. An antitheft device according to claim 11, wherein the prescribed space is around the seat.

13. An antitheft device according to claim 11, wherein the driving unit of the expansible body system emits a substance which is a base of foaming polystyrene inside the vehicle and applies steam to the emitted substance.

14. An antitheft device according to claim 11, wherein the expansible body system is an air bag system.

15. An antitheft device according to claim 6, further comprising:
a reporting unit operable to make a report to the outside; and
a report controller operable to control said reporting unit so as to make a report to the outside when a condition for changing the state of the seat into the first prescribed state is met.

16. An antitheft device, which is mounted on a vehicle having an expansible body system to expand an expansible body in a prescribed space inside the vehicle, said antitheft device comprising:
an intrusion pre-detector operable to detect a person who is attempting to intrude into the vehicle;
a controller operable to control a driving unit of the expansible body system so as to expand the expansible body when a preset time elapses after a person who is attempting to intrude into the vehicle is detected by said intrusion pre-detector; and
a count stop device to stop counting to the preset time when the detection of the person who is attempting to intrude into the vehicle by said intrusion pre-detector has ended;
wherein said controller is to be connected to a driving unit of a gas ejection system, and is operable to control the driving unit of the gas ejection system so as to eject a gas inside the vehicle; and
wherein the driving unit of the gas ejection system is controlled so as to eject the gas inside the vehicle when a predetermined condition of an elapse of a preset time is met after a condition for expanding the expansible body is met.

17. An antitheft device according to claim 16, wherein the driving unit of the expansible body system emits a substance which is a base of foaming polystyrene inside the vehicle and applies steam to the emitted substance.

18. An antitheft device according to claim 16, wherein the expansible body system is an air bag system.

19. An antitheft device according to claim 16, further comprising:
a reporting unit operable to make a report to the outside; and
a report controller operable to control said reporting unit so as to make a report to the outside when a condition for expanding the expansible body is met.

20. An antitheft device, which is mounted on a vehicle having a seat changing system to change the state of a seat placed inside the vehicle, said antitheft device comprising:
an intrusion pre-detector operable to detect a person who is attempting to intrude into the vehicle; and
a controller operable to control a driving unit of the seat state changing system so as to change the state of the seat into a first prescribed state so that the motion of an intruder is blocked when a preset time elapses after a person who is attempting to intrude into the vehicle is detected by said intrusion pre-detector;
wherein said controller is to be connected to a driving unit of an expansible body system, and is operable to control the driving unit of the gas ejection system so as to expand an expansible body in a prescribed space inside the vehicle; and wherein the driving unit of the expansible body system is controlled so as to expand the expansible body when a condition for changing the state of the seat into the first prescribed state is met.

21. An antitheft device according to claim 20, wherein the first prescribed state is the state of the seat being moved forward in the vehicle, and/or the backrest portion of the seat being inclined forward in the vehicle.

22. An antitheft device according to claim 20,
wherein said controller is to be connected to a driving unit of a steering state changing system, and is operable to control the driving unit so as to change a state of the steering; and wherein the driving unit of the steering state changing system is controlled so as to change a state of the steering into a second prescribed state so that the motion of an intruder is blocked when a condition for changing the state of the seat into the first prescribed state is met.

23. An antitheft device according to claim 22, wherein the second prescribed state is the state of the steering being tilted downward, and/or the steering being protruded rearward in the vehicle.

24. An antitheft device according to claim 20, wherein the prescribed space is around the seat.

25. An antitheft device according to claim 20, wherein the driving unit of the expansible body system emits a substance which is a base of foaming polystyrene inside the vehicle and applies steam to the emitted substance.

26. An antitheft device according to claim 20, wherein the expansible body system is an air bag system.

27. An antitheft device according to claim 20, further comprising:
a reporting unit operable to make a report to the outside; and a report controller operable to control said reporting unit so as to make a report to the outside when a condition for changing the state of the seat into the first prescribed state is met.

28. An antitheft device, which is mounted on a vehicle having a seat changing system to change the state of a seat placed inside the vehicle, said antitheft device comprising:
an intrusion pre-detector operable to detect a person who is attempting to intrude into the vehicle; and a controller operable to control a driving unit of the seat state changing system so as to change the state of the seat into a first prescribed state so that the motion of an intruder is blocked when a preset time elapses after a person who is attempting to intrude into the vehicle is detected by said intrusion pre-detector;

wherein said controller is to be connected to a driving unit of a gas ejection system, and is operable to control the driving unit of the gas ejection system so as to eject gas inside the vehicle; and wherein the driving unit of the gas ejection system is controlled so as to eject gas inside the vehicle when a predetermined condition of an elapse of a preset time is met after a condition for changing the state of the seat into the first prescribed state is met.

29. An antitheft device according to claim 28, wherein the first prescribed state is the state of the seat being moved forward in the vehicle, and/or the backrest portion of the seat being inclined forward in the vehicle.

30. An antitheft device according to claim 28,
wherein said controller is to be connected to a driving unit of a steering state changing system, and is operable to control the driving unit so as to change a state of the steering; and wherein the driving unit of the steering state changing system is controlled so as to change a state of the steering into a second prescribed state so that the motion of an intruder is blocked when a condition for changing the state of the seat into the first prescribed state is met.

31. An antitheft device according to claim 30, wherein the second prescribed state is the state of the steering being tilted downward, and/or the steering being protruded rearward in the vehicle.

32. An antitheft device according to claim 28, further comprising:
a reporting unit operable to make a report to the outside; and a report controller operable to control said reporting unit so as to make a report to the outside when a condition for changing the state of the seat into the first prescribed state is met.

* * * * *